US011145077B2

(12) United States Patent
Blasco Claret et al.

(10) Patent No.: US 11,145,077 B2
(45) Date of Patent: Oct. 12, 2021

(54) DEVICE AND METHOD FOR OBTAINING DEPTH INFORMATION FROM A SCENE

(71) Applicant: PHOTONIC SENSORS & ALGORITHMS, S.L., Valencia (ES)

(72) Inventors: Jorge Vicente Blasco Claret, Valencia (ES); Carles Montoliu Alvaro, Valencia (ES); Ivan Virgilio Perino, Valencia (ES); Adolfo Martinez Uso, Valencia (ES)

(73) Assignee: PHOTONIC SENSORS & ALGORITHMS, S.L., Valencia (ES)

( * ) Notice: Subject to any disclaimer, the term of this patent is extended or adjusted under 35 U.S.C. 154(b) by 80 days.

(21) Appl. No.: 16/483,552

(22) PCT Filed: Feb. 6, 2017

(86) PCT No.: PCT/EP2017/052542
§ 371 (c)(1),
(2) Date: Aug. 5, 2019

(87) PCT Pub. No.: WO2018/141414
PCT Pub. Date: Aug. 9, 2018

(65) Prior Publication Data
US 2020/0134849 A1 Apr. 30, 2020

(51) Int. Cl.
*G06T 7/593* (2017.01)
*G06T 7/579* (2017.01)
*G06T 7/70* (2017.01)

(52) U.S. Cl.
CPC .............. *G06T 7/593* (2017.01); *G06T 7/579* (2017.01); *G06T 7/70* (2017.01); *G06T 2207/10012* (2013.01); *G06T 2207/10028* (2013.01)

(58) Field of Classification Search
CPC ........... G06T 7/593; G06T 7/579; G06T 7/70; G06T 2207/10012; G06T 2207/10028
(Continued)

(56) References Cited

U.S. PATENT DOCUMENTS 9,384,551 B2 * 7/2016 Ramaswamy ............ G06T 7/85
10,003,743 B2 * 6/2018 S V .................... H04N 5/23267
(Continued)

FOREIGN PATENT DOCUMENTS

EP 2887642 A2 * 6/2015 ........... H04N 13/128

OTHER PUBLICATIONS

Zeshan Alam Met al: "Hybrid Light Field Imaging for Improved Spatial Resolution and Depth Range", arxiv.org, Cornell University Library, 201 Olin Library Cornell University Ithaca, NY 14853, Nov. 15, 2016 (Nov. 15, 2016), XP080732041,) (Year: 2016).*
(Continued)

*Primary Examiner* — Ishrat I Sherali
(74) *Attorney, Agent, or Firm* — Lucas & Mercanti, LLP

(57) ABSTRACT

A method for obtaining depth information from a scene is disclosed wherein the method has the steps of: a) acquiring a plurality of images of the scene by means of at least one camera during a time of shot wherein the plurality of images offer at least two different views of the scene; b) for each of the images of step a), simultaneously acquiring data about the position of the images referred to a six-axis reference system; c) selecting from the images of step b) at least two images; d) rectifying the images selected on step c) thereby generating a set of rectified images; and e) generating a depth map from the rectified images. Additionally devices for carrying out the method are disclosed.

10 Claims, 19 Drawing Sheets

(58) Field of Classification Search
USPC .......................................................... 382/154
See application file for complete search history.

(56) References Cited

U.S. PATENT DOCUMENTS

| | | | |
|---|---|---|---|
| 10,008,027 B1* | 6/2018 | Baker | G06T 7/50 |
| 10,313,657 B2* | 6/2019 | Zhao | H04N 13/122 |
| 10,334,165 B2* | 6/2019 | Anderson | H04N 13/221 |
| 10,728,529 B2* | 7/2020 | Ravirala | H04N 5/3532 |
| 2021/0004933 A1* | 1/2021 | Wong | G06T 7/30 |

OTHER PUBLICATIONS

Wanner, Sven, and Bastian Goldluecke. "Variational light field analysis for disparity estimation and super-resolution." Pattern Analysis and Machine Intelligence, IEEE Transactions on 36.3 (2014): 606-6 19. (Year: 2014).*

* cited by examiner

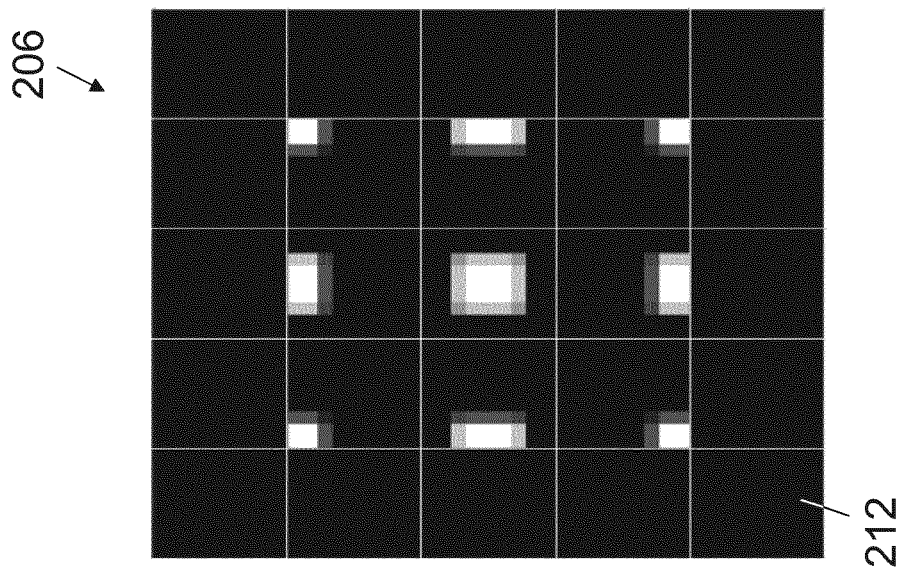
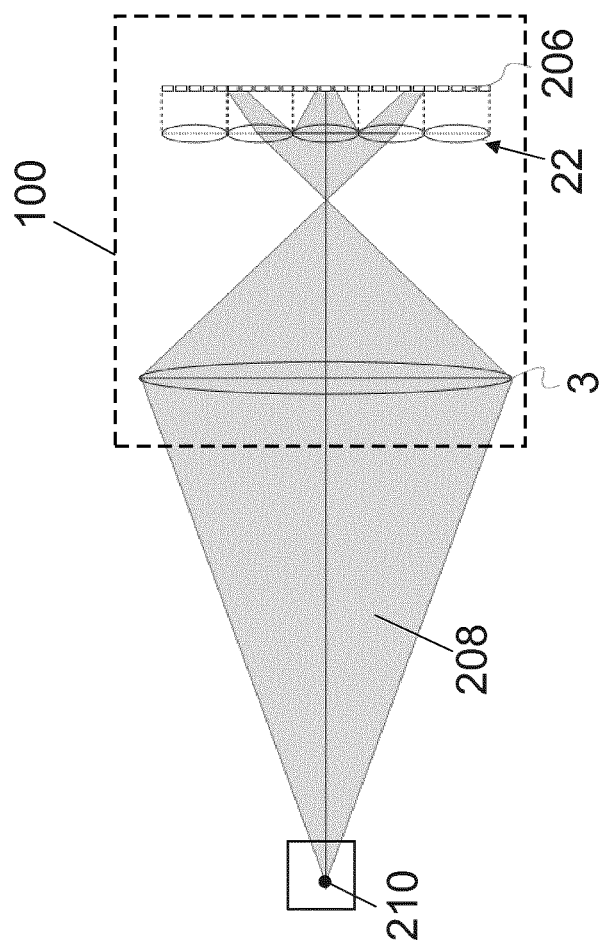
Fig. 2A
Fig. 2B

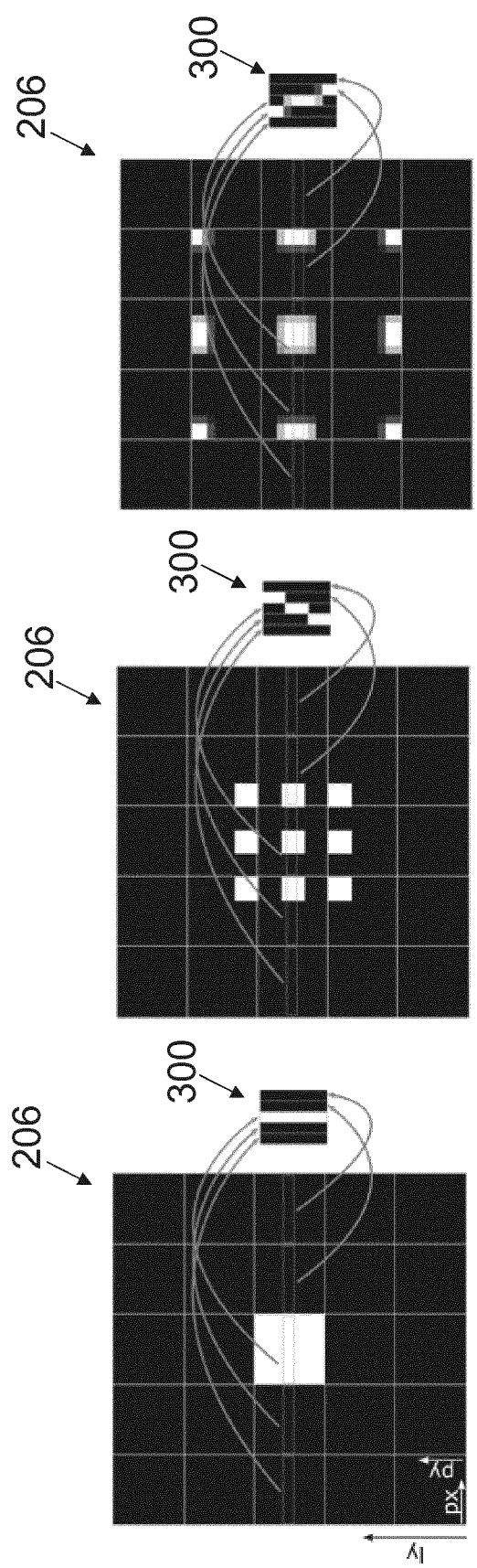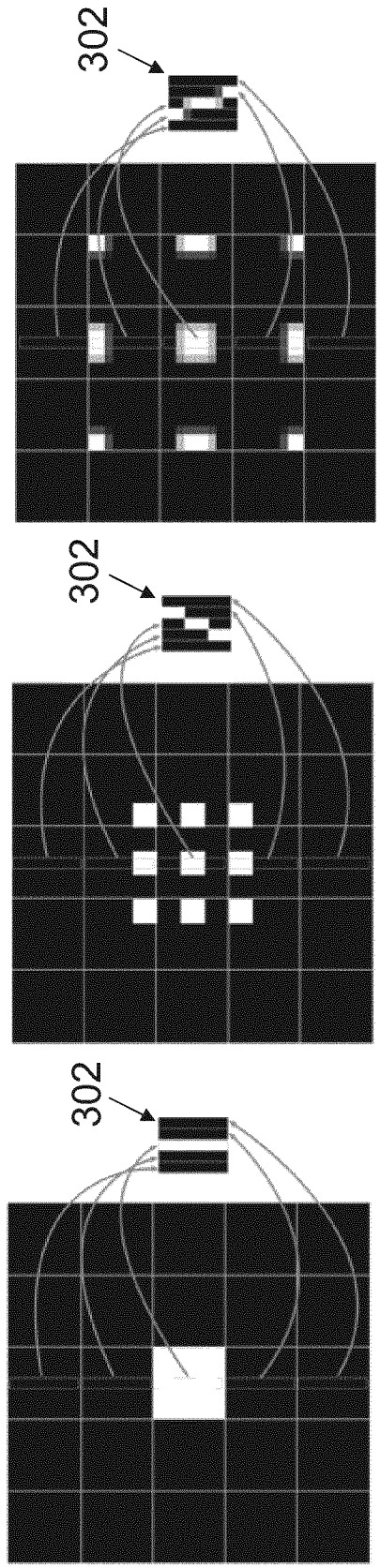
Fig. 3A    Fig. 3B    Fig. 3C

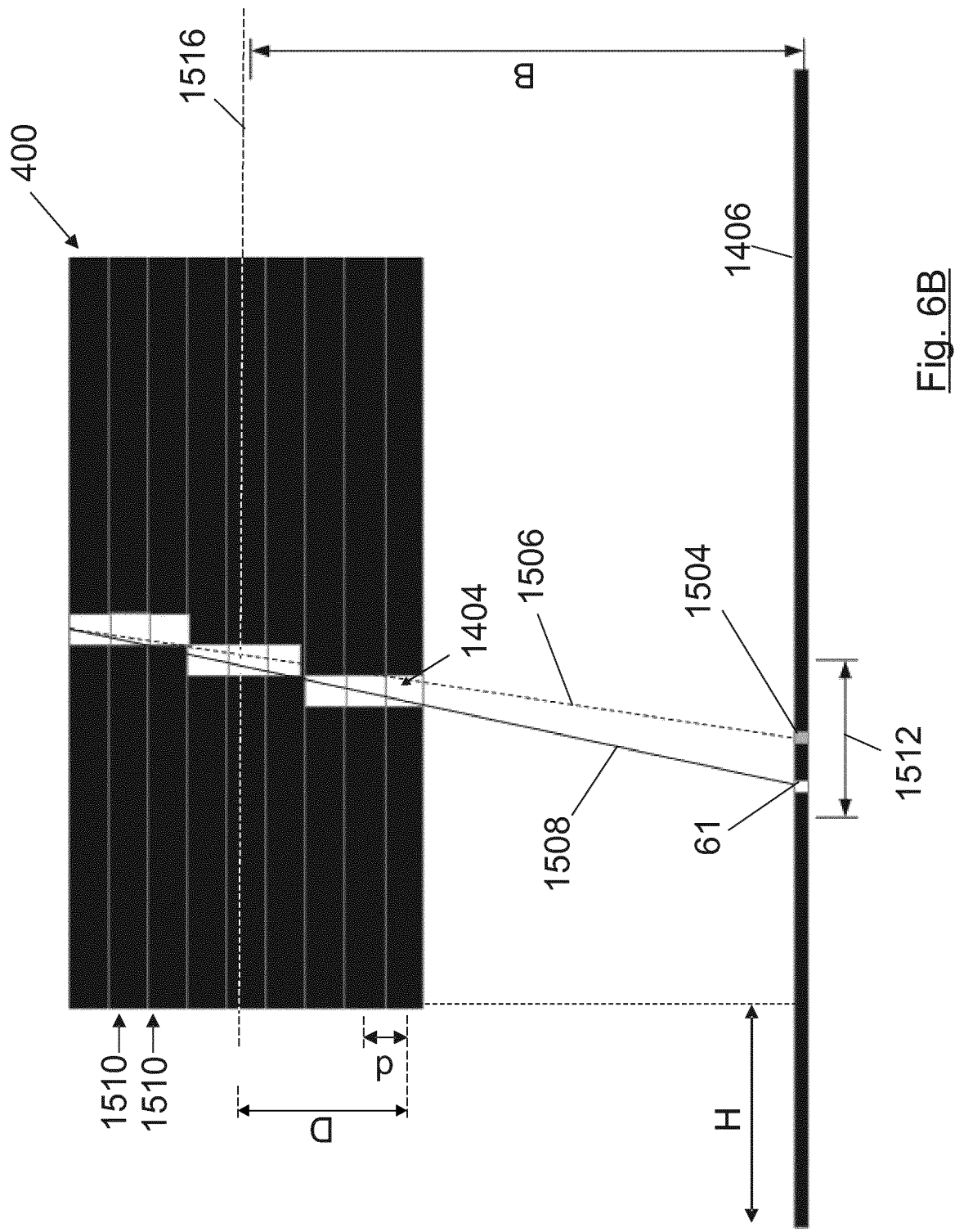

DEVICE AND METHOD FOR OBTAINING DEPTH INFORMATION FROM A SCENE

CROSS-REFERENCE TO RELATED APPLICATIONS

This application is a 371 of PCT/EP2017/052542, filed Feb. 6, 2017, which is incorporated herein by reference.

TECHNICAL FIELD

The present invention is comprised in the field of digital image processing, and more particularly to methods and systems for estimating distances and generating depth maps from images.

BACKGROUND ART

Recovering 3D information from images is a widely-studied problem in computer vision, having important applications in robotics, scene understanding and 3D reconstruction. Depth map estimation is mostly obtained by processing more than one view (usually two views) of a scene, either by taking several images of the scene with one device or by taking several images using several devices (usually two cameras in a stereo-camera configuration). This is known as Multiview (or stereo vision in the case of two cameras or two views) and is based on triangulation techniques. A general approach to extract the depth information of an object point is measuring the displacement of the image of this point over the several captured images of the scene. The displacement or disparity is directly related to the actual depth of the object. In order to obtain the disparity of a point, it is necessary to identify the position of the same point in the rest of the views (or at least in two views). This problem is usually solved using correspondence algorithms, a well-known process in the image processing research field. However, stereo vision techniques present two relevant weaknesses compared to the invention proposed in this document: first the need to have (at least) two cameras is an important constraint in many cases, and second the fact that stereo approaches are much more computationally expensive, since they usually require computing intensive correspondence algorithms (matching patterns from two or more images).

An alternative to have multiple devices or to take multiple pictures of a scene would be to use a plenoptic camera. Plenoptic cameras are imaging devices capable to capture not only spatial information but also angular information of a scene in a structure that is called the Light Field. Plenoptic cameras are commonly composed by a main lens (or a set of lenses equivalent to said main lens), a Microlens Array (MLA) and a sensor.

Time-of-Flight (ToF) cameras produce a depth map that can directly be used to estimate the 3D structure of the object world without the help of traditional computer-vision algorithms. ToF cameras work by measuring the phase-delay of reflected infrared (IR) light previously transmitted by the camera itself. Although already present in some mobile devices this technology is still far of being accepted as a common capability due to the fact that it has much higher bulkiness and power dissipation (the imaging camera, the IR-transmitter and the IR-camera, and the processing to match images between both cameras), besides, the distance that can be discriminated with technologically feasible IR-transmitters is quite limited, and open air conditions during sunny days further restrict its use, as large light power from day light masks the IR sensors.

Mobile devices commonly incorporate at least one camera for taking still images and videos. The cameras integrated in mobile devices provide a lot of capabilities to the user, however, among these capabilities, manufacturers cannot offer a realistic depth map of a scene when only one camera is available.

There are approaches that consider the task of depth estimation from only a single still image as input, most of the times based on heuristic interpretations of perspective and reductions of size for objects that are known to be of constant size. However, these approaches make assumptions that often fail to generalise for all the possible image scenarios, such as assuming the particular perspective of the scene. They are also based on the use of prior knowledge about the scene; which is generally a highly unrealistic assumption. Depth maps obtained in this way, although useful for other tasks, will always be inherently incomplete and are not accurate enough to produce visually-pleasant 3D images.

Another methodology to obtain 3D information from images is the synthetic aperture integral imaging (SAII). This method needs a camera array (or a mechanical movement of a camera simulating taking sequential pictures that simulate a camera array), obtaining multiple high-resolution perspectives with the camera at different points of the array.

The present invention uses some of the concepts from methods used by previous art in stereo-photography in a novel manner: a first step in stereo-photography is the "calibration" of the cameras (step that can be avoided in our invention due to the fact that the camera is assumed to be already calibrated), a second step is called "rectification" (where the images from the two cameras in the stereo pair are adequately processed to infer the images that would have been recorded if the two cameras of the stereo pair were completely aligned and coplanar), the "camera rectification" in our invention is very different of what is done in stereo-imaging and described in detail later. The third step in stereo-photography is the "correspondence", process to identify patterns in the two images of the stereo-pair already "rectified", to afterwards perform triangulations to compute distances to the object world and to compose 3D images. The three steps described "cameras calibration", "rectification of the images" and "correspondence between views" (usually two views) are commonly referred to as "Registration". The invention uses the same terminology, but the processes of "correspondence" and "rectification" (and hence "Registration") are different than in previous art, i.e., different than in stereo-cameras or multiview cameras.

The proposed invention assumes a scenario in which the user wants to obtain a high-resolution depth map from a conventional camera with a single shot acquisition and in real-time. The invention takes advantage of the movement that suffers a camera during the time of shooting, being this movement recorded from the data provided by, for instance, the accelerometer and gyroscope devices (devices that are present in nearly any mobile telephone at the moment to write this patent). The image processing proposed herein improves 3D vision state-of-the-art approaches in terms of number images (hence number of cameras) needed, computational efficiency and power requirements. On the other hand, the invention improves the approaches based on plenoptic cameras in terms of spatial resolution and of reliability for large depths in the resulting depth map.

SUMMARY OF THE INVENTION

The processing method herein described implements an extremely simplified correspondence algorithm between several images captured by a mobile device with a single conventional camera, several images that are captured sequentially, and the position where every image has been captured can be calculated by using the accelerometer, gyroscope or any other capability of this kind integrated in the mobile device, automobile or any moving object. Once the correspondence matching between images is performed, the images are used to create a dense depth map of the scene.

Images are taken in a single shot by a handheld mobile device, the movement of the mobile device can be detected and processed during the time lapse the shot is taking place. This movement can be produced by the inherent movement of hands (hand tremors), by the vibrations for incoming calls (conveniently programmed to vibrate while shooting a picture or a video) or because the camera is on a moving object (for example a vehicle or automobile) or because the user is moving. The methods described herein may be efficiently parallelized with the purpose of implementing them in parallel processors and/or GPUs (more and more widely spread) as well as specific parallel processors for battery operated mobile devices. The invention provides real-time processing for video recording.

For the description of the present invention the following definitions will be considered hereinafter:

- Plenoptic camera: A device capable of capturing not only the spatial position but also the direction of arrival of the incident light rays.
- Light field: four-dimensional structure LF(px, py, lx, ly) that contains the information from the light captured by the pixels (px, py) below the microlenses (lx, ly) in a plenoptic camera or a Synthetic Aperture Integral Imaging system.
- Depth: distance between the plane of an object point of a scene and the main plane of the camera, both planes are perpendicular to the optical axis.
- Epipolar image: Two-dimensional slice of the light field structure composed by choosing a certain value of (px, lx) (vertical epipolar) or (py, ly) (horizontal epipolar) as described in FIG. 3.
- Epipolar line: Set of connected pixels within an epipolar-image corresponding to image edges in the object world.
- Plenoptic view: two-dimensional image formed by taking a slice of the light field structure by choosing a certain value (px, py), the same (px, py) for every one of the microlenses (lx, ly).
- Depth map: two-dimensional image in which the calculated depth values of the object world (dz) are added as an additional value to every position (dx, dy) of the two-dimensional image, composing (dx, dy, dz). Each pixel of the depth map encodes the distance to the corresponding point in the scene
- Microlens Array (MLA): array of small lenses (microlenses).
- Microimage: image of the main aperture produced by a certain microlens over the sensor.
- Baseline: distance between the centre of the apertures of two images (taken by plenoptic or conventional cameras or any camera).
- Stereo matching (also called correspondence algorithms): this term relates to the process of, given two images of the same scene, knowing which pixels of one image represent the same points of the scene in the pixels of the second image. A parallel can be made with human eyes, the problem then is which points seen by the left eye correspond to which points seen by the right eye.
- Shoot: Act of pressing the button with the purpose of taking a picture. Many frames can eventually be acquired during this event.
- Shot: Act of having pressed the button with the purpose of taking a picture.
- Exposure: a camera sensor is exposed to incoming light if its aperture is opened, allowing the light to enter the camera.
- Accelerometer: device that registers the linear acceleration of movements of the structure to which it is attached (usually in the x, y, z directions).
- Gyroscope: device that provides the angular rotational acceleration (as opposed to the linear acceleration of the accelerometer) usually referred to the three-rotational axis (pitch, roll and yaw; as opposed to x, y and z in accelerometers).
- IMU and AHRS: Inertial measurement units (IMU) and Attitude and Heading reference systems (AHRS) are electronic devices that monitor and report an object's specific force, angular rate, and sometimes the magnetic field surrounding the body by using a combination of accelerometers and gyroscopes, and sometimes also magnetometers. IMUs and AHRSs are typically used within aircrafts, including unmanned aerial vehicles (UAVs) and vessels including submarines and unmanned underwater vehicles (UUV). The main difference between an inertial measurement unit (IMU) and an AHRS is the addition of on-board processing system (which for example can include microprocessors and memories) in an AHRS which provides attitude and heading information, as compared to IMUs which just provides sensor data to an additional device that computes attitude and heading.
- Speedometer: An instrument which measures and indicates the change in position of an object over time (speed). GPS: The Global Positioning System (GPS) is a global navigation system by means of the use of satellites that provide the geolocalisation and time information to a GPS receiver.
- Image rectification: in the context of this invention the process of applying 2 dimensional projective transforms to images acquired at different moments in time by moving cameras whose 3-dimensional geometry is known, so that lines and patterns in the original images (referred to a six axis reference system [x', y', z', pitch', roll' and yaw'] in which the moving camera is shooting after a certain amount of time t1) are mapped to align lines and patterns in the transformed images (referred to a six axis reference system [x, y, z, pitch, roll and yaw] in which the camera was at time zero), resulting in two images (initially acquired at times t1 and zero) that are comparable images as if they had been acquired by coplanar cameras with the same z, pitch, roll and yaw, and with "rectified" values of x and y that depend on the movement along those two axis (baselines in x and y between time 0 and time t1). After the image rectification process the shots at time 0 and at time t1 can be used to compose different views of "virtual stereo-cameras", and/or different views of "virtual Multiview cameras" and/or different views of "virtual plenoptic cameras".
- Mobile device: small computing device, generally small enough to be handheld operated. They also have integrated cameras and other capabilities such as GPS, accelerometer, gyroscope, etc. They can be mobile phones, tablets, laptops, cameras and other devices.

Conventional camera: device that captures only the spatial position of the light rays incident to the image sensor, such that each pixel of the sensor integrates all the light coming in any direction from the whole aperture of the device.

Synthetic Aperture Integral Imaging (SAII): an array of image sensors (cameras) distributed in a homogeneous or (alternatively) random grid.

In essence, the present invention discloses a method for obtaining depth information from a scene, comprising the steps of:
a) acquiring a plurality of images of the scene by means of at least one camera during a time of shot wherein the plurality of images offer at least two different views of the scene;
b) for each of the images of step a), simultaneously acquiring data about the position of the images referred to a six-axis reference system;
c) selecting from the images of step b) at least two images;
d) rectifying the images selected on step c) thereby generating a set of rectified images; and
e) generating a depth map from the rectified images.

The position of the images during the time of shot can be measured from a set of positioning data acquired by means of at least one positioning device, for example, a device selected from the group of: an accelerometer, an inertial measurement unit (IMU), an attitude and heading reference system (AHRS), a GPS, a speedometer and/or a gyroscope.

Inertial measurement units (IMU) and Attitude and Heading reference systems (AHRS) are electronic devices that monitor and report an object's specific force, angular rate, and sometimes the magnetic field surrounding the body by using a combination of accelerometers and gyroscopes, and sometimes also magnetometers. IMUs and AHRSs are typically used within aircrafts, including unmanned aerial vehicles (UAVs) and vessels including submarines and unmanned underwater vehicles (UUV). The main difference between an inertial measurement unit (IMU) and an AHRS is the addition of on-board processing system (which for example can include microprocessors and memories) in an AHRS which provides attitude and heading information, as compared to IMUs which just provides sensor data to an additional device that computes attitude and heading.

In order to achieve a better accuracy, the positioning device may be rigidly attached to at least one of the cameras.

In an embodiment, at least one camera is associated to a mobile device. Such mobile device can be, for example, a smartphone, a tablet, a laptop or a compact camera.

In a more preferred embodiment, on step c), the images are selected based on their positions in the six-axis reference system.

In a first preferred embodiment, the images are selected so that their relative distances are small enough to cause a maximum disparity of, at most, one pixel. In this case, on step e) a Virtual Synthetic Aperture Integral Imaging System can be generated with the rectified images thereby generating a set of epipolar images.

In a second preferred embodiment, the images are selected so that their relative distances are big enough to cause a disparity of more than one pixel. In this case, on step e), a Virtual Stereo-Plenoptic system is generated with the rectified images thereby generating a set of extended epipolar images.

Once the epipolar images are generated by, e.g., the first preferred embodiment or the second preferred embodiment, step e) may further comprise calculating slopes of epipolar lines from the epipolar images. With these epipolar images, a depth map of the scene may be generated by converting the slopes of the epipolar lines to depths.

Additionally, the slopes may be obtained by analysing the horizontal and vertical epipolar-lines are combined into a multi-dimensional matrix.

The method of the present invention can comprise a step of generating a 3-dimensional image of the scene from the depth map. In particular, depths/slopes may be calculated in the horizontal and/or vertical epipolar-lines are directly combined into a two-dimensional sparse depth/slope map. Moreover, the sparse depth/slope map can be filled by applying image filling techniques to obtain depth/slope values for every pixel. Preferably, for depth estimation the calculations are performed only for those pixels of the sensors where edges of the object world have been detected In step a), at least one camera is preferably moved during the time of shot, for example, due to uncertain random movements produced by human hand tremors or by attaching at least one camera to a structure moving relative to the scene (for instance the camera is mounted or placed in an automobile location with ample visibility to areas of concern outside of the automobile, or to measure distances inside the automobile for applications such as gesture recognition).

Also, the plurality of images of step a) are, preferably, acquired by at least two cameras. In this case, the at least two cameras may be aligned with their relative positions being known.

In a preferred embodiment, a video-sequence is composed with at least two depth levels of foreground, optional middlegrounds and background 2D-images (located at different depths in the object world) and wherein said combination of different levels of 2D-images in successive frames and/or the change of occlusions in 2D-images nearer the background and/or the change in perspective and size in 2D images nearer the foreground produce a 3D-perception to the user.

Furthermore, in an exemplary embodiment, only some or all of the epipolar images distributed along the vertical/horizontal dimension are considered in order to reduce statistical noise

BRIEF DESCRIPTION OF THE DRAWINGS

A series of drawings which aid in better understanding the invention and which are expressly related with embodiments of said invention, presented as non-limiting examples thereof, are very briefly described below.

FIG. 2 shows a plenoptic camera embodiment (2A) with the pattern produced over the sensor (2B) for a point in the object world located further from the camera than the conjugated plane of the MLA.

FIG. 3 shows the formation process of horizontal and vertical central epipolar images from a light field for radiating points in the object world.

FIGS. 6A and 6B illustrate the extension process of an epipolar image captured with a plenoptic camera with a 2D image of the same scene captured by a conventional camera with both cameras in a stereo configuration as in FIG. 5A.

DETAILED DESCRIPTION

The present invention relates to a device and method for generating a depth map from a light field. A light field can be captured by multiple kinds of devices. For simplicity, a first example wherein a conventional camera that is moving while taking several images will be considered. The method described herein creates an equivalent imaging system from these images captured by a moving device and applies plenoptic algorithms to generate a depth map of a scene.

In a further example, the method is described by applying it to systems formed by several moving cameras with the possibility of including one or more plenoptic cameras and one or more conventional cameras. Nevertheless, the method herein described can be applied to light fields captured by any other device, including other integral imaging devices.

Figure 1:
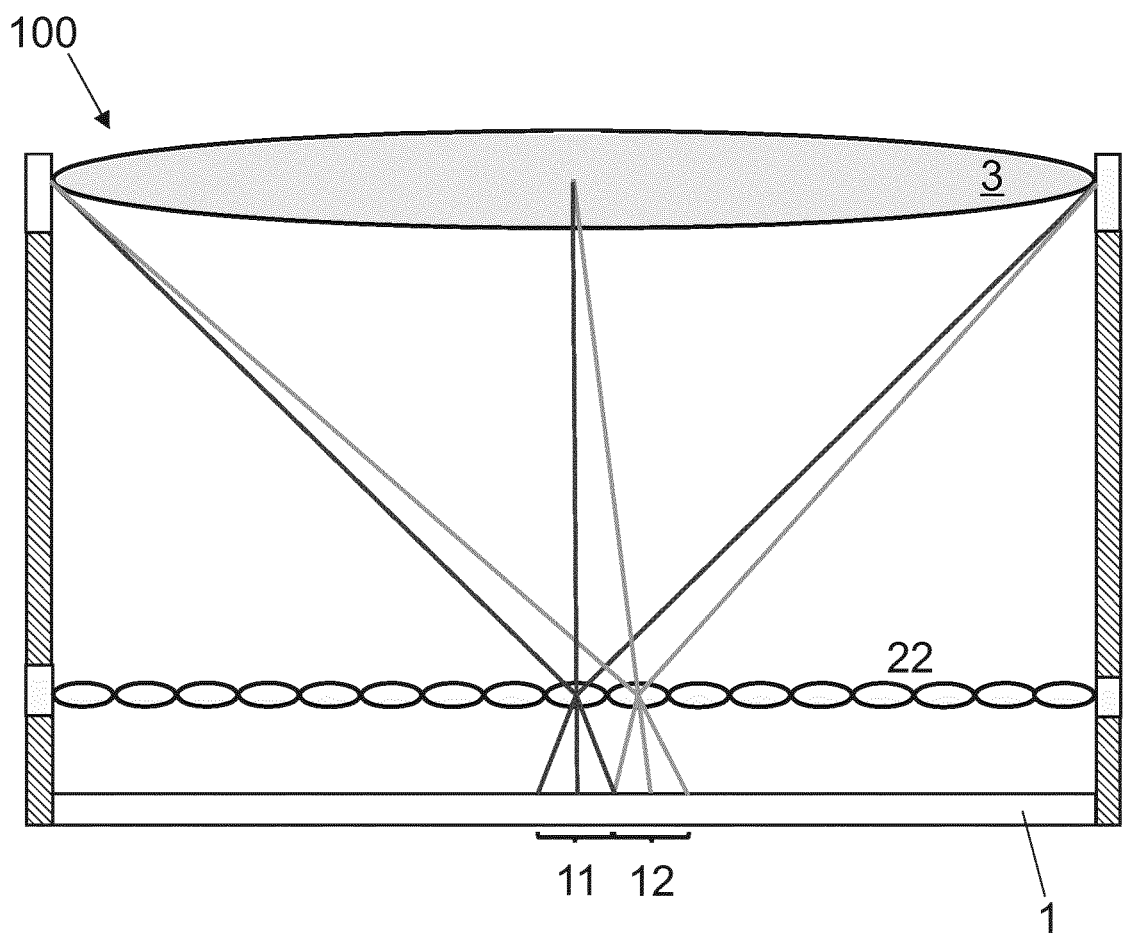
FIG. 1 shows a schematic of the plenoptic camera 100, including a sensor, a MLA (Micro Lens Array), and a main lens of the camera. It also shows two microimages.

FIG. 1 illustrates an embodiment of a plenoptic camera 100: a sensor 1, the microlenses 22, and the upper barrel of optical components (or main lens 3 of the camera). FIG. 1 shows two sets of rays crossing the main aperture of the plenoptic system and reaching the central and next to the central microlenses. Microimages 11, 12 do not overlap if the optical system is designed adequately.

FIG. 2 shows an object point 210 that is further than the conjugated plane of the microlens array 22 through the main lens 3. hence illuminates more than one microlens, such that the focus point is closer to the main lens 3 than the microlens array 22 position and, thus, the pattern captured by the image sensor 206 is shown in FIG. 2B. The grey levels in some of the microimages 212 correspond to pixels partially illuminated whereas in the white pixels the whole area of the pixel has been hit by the light coming from the object point 210 in the object world.

The basics in plenoptic imaging are that the objects in the world at different depths or distances to the camera will produce different illumination patterns on the sensor of a plenoptic camera. The various patterns captured by the sensor can be represented in epipolar images, which provide implicit depth information of objects in the world.

FIG. 3 shows the formation process of horizontal 300 and vertical 302 central epipolar images from a light field 206 for radiating points in the object world 210 located at different distances from a plenoptic camera 100: at the conjugated distance from the microlenses 22 (FIG. 3A), nearer than the conjugated distance (FIG. 3B), and further than the conjugated distance (FIG. 3C), thereby showing the inherent capability of plenoptic cameras to calculate distances to the object world. The case of FIG. 3C is displayed in FIGS. 2A and 2B, showing how light from the radiating point 210 in the object world propagates inside the camera 100, crossing the microlenses 22 and printing a light pattern over the sensor 206.

The process to transform the patterns found in epipolar images to depth information requires the application of some image processing techniques well known in the state of the art. Epipolar images contain epipolar lines; which are connected pixels forming a line (several sensor pixels corresponding to the same point in the object world), as clearly shown in FIGS. 2B and 3C for world radiating sources further than the focus point of the microlenses (epipolar line tilted towards the left in FIG. 3C), for world radiating sources nearer than the focus of the microlenses (epipolar line tilting towards the right in FIG. 3B), and for world radiating sources focused precisely over the surface of the microlens (vertical epipolar line in FIG. 3A). The slopes of these epipolar lines are directly related to the shape of the pattern illuminated over the microlenses and to the corresponding depth of that point in the object world. Summarising the process, patterns found in epipolar images, the epipolar lines, provide information about the depth of the objects in the real object world. These lines may be detected using edge detection algorithms and their slopes may be measured. Hence the slope from each epipolar line gives a value that conveniently processed provides the actual depth of the point in the object world that produced such pattern.

Although it is a very promising technology, plenoptic imaging also comes at a cost, since the performance of a plenoptic camera is restricted by the resolution of the microlens array, which results in a much lower image resolution than traditional imaging devices. Furthermore, plenoptic cameras are a quite new technology that is still difficult to find in mobile devices.

Figure 4:
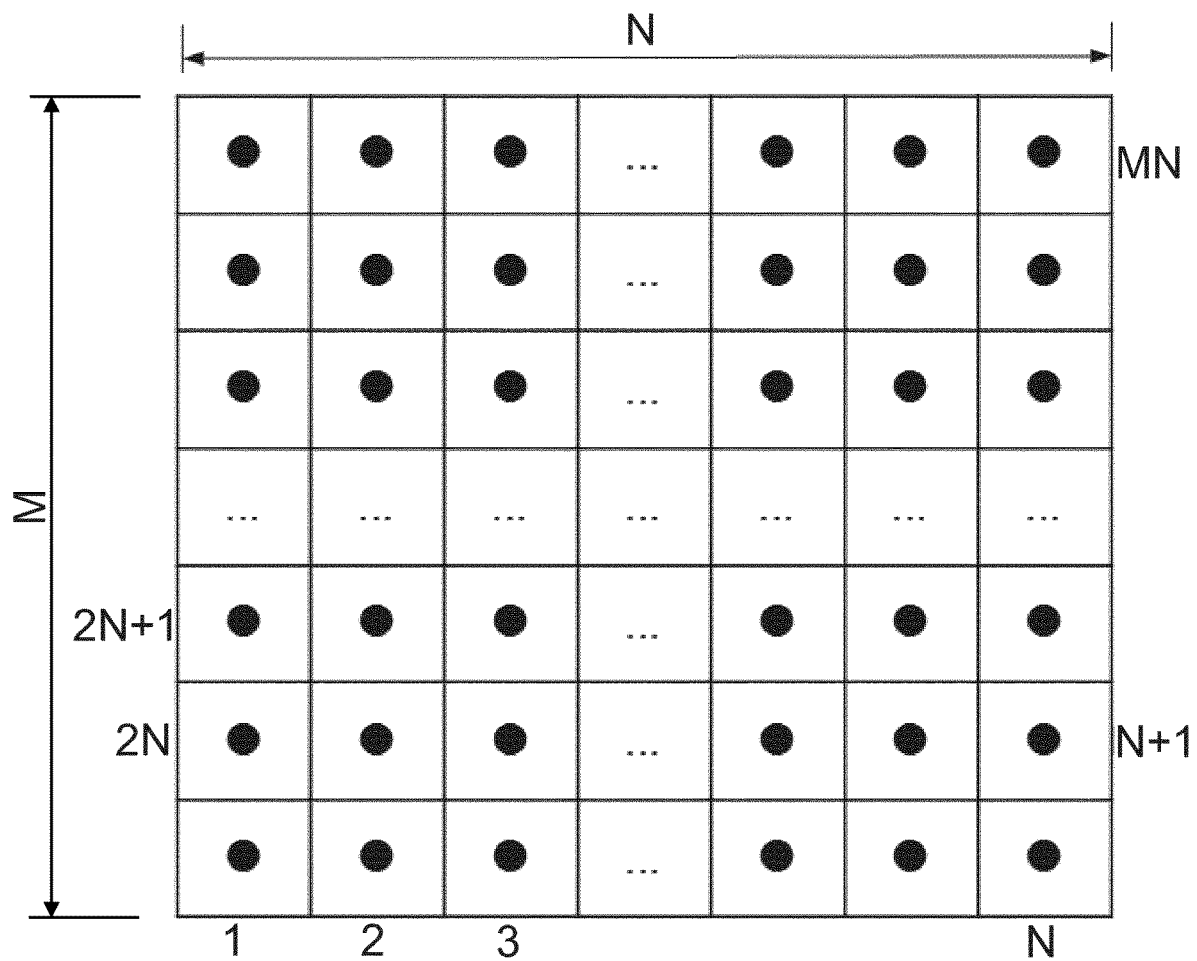
FIG. 4 shows a possible embodiment of a multiview Synthetic Aperture Integral Imaging (SAII) system: a bi-dimensional array of M×N cameras.
Figure 5B:
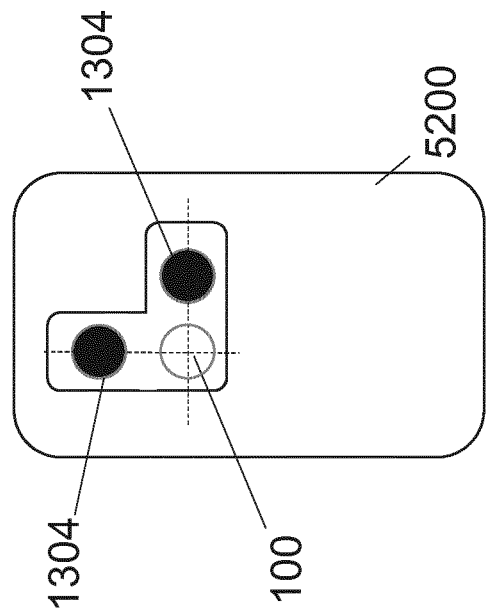
FIG. 5B shows a mobile device with a plenoptic camera and two additional conventional cameras (however any of the two additional cameras can be either a conventional camera or a plenoptic camera).
Figure 5A:
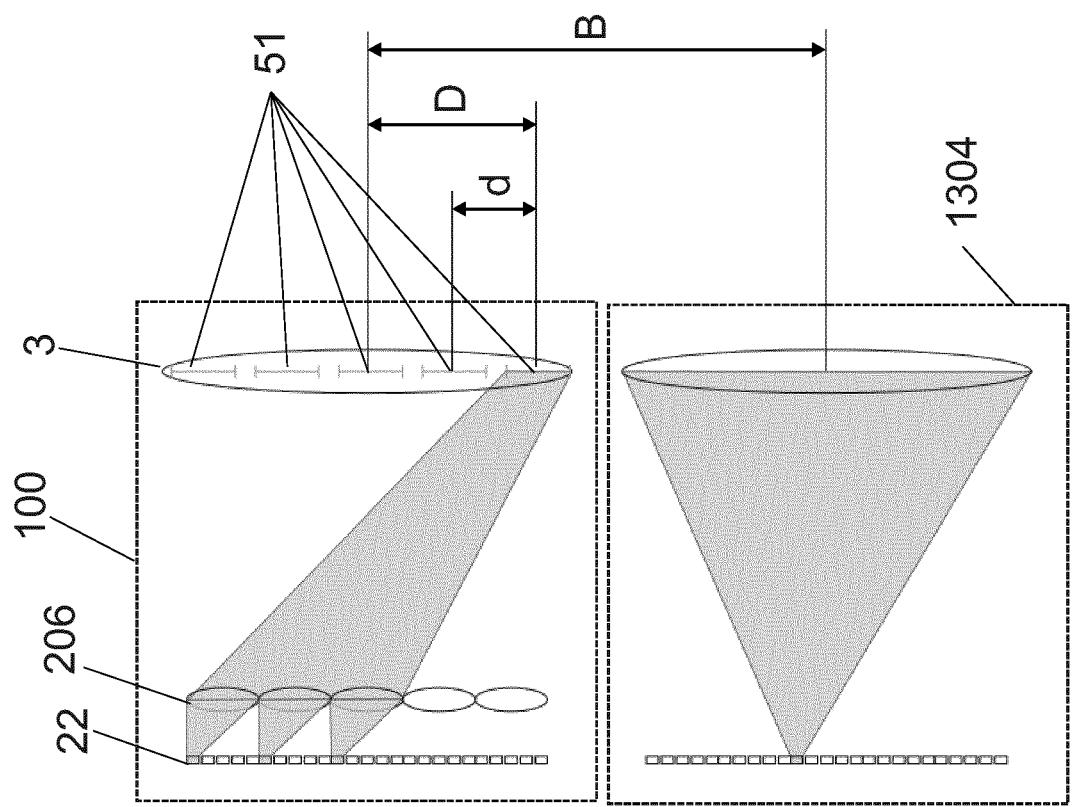
FIG. 5A illustrates a comparison between the baseline of a plenoptic camera ("Narrow baseline") and the baseline between two cameras in a stereo configuration ("Wide baseline"). The camera at the top is a plenoptic camera and the camera at the bottom is a conventional camera, both of them arranged in a Stereo-Plenoptic camera configuration.

FIG. 4 shows a possible SAII (Synthetic Aperture Integral Imaging) configuration of a matrix of cameras. In this matrix, we can have M×N cameras or a single camera that is moved along the matrix (for instance, starting at position 1, then 2, 3, etc., until position MN) taking a still image in each position of the matrix. The parallel with a plenoptic camera is straightforward and the same epipolar images previously described for a plenoptic camera can be obtained with a SAII, as it is well known that a plenoptic camera as in FIG. 2A with "O×P" pixels per microlens and "T×S" microlenses is functionally equivalent to "O×P" conventional cameras with "T×S" pixels with the cameras evenly spaced over the entry pupil of the plenoptic camera. Likewise, the M×N array of cameras of FIG. 4 (with Q×R pixels per camera) is equivalent to a plenoptic system as in FIG. 1 with M×N pixels per microlens 22 and a number of pixels per equivalent camera 51 equal to the total number of microlenses in the equivalent plenoptic camera. The only practical difference is that the size of this number (Q×R) in a SAII system, due to technology and implementation limitations, is much higher than the number of microlenses that can be designed in a plenoptic camera. Depth maps computed from a SAII can take profit of a wider baseline than plenoptic cameras as the distance between nodes in FIG. 4 (that may be as high as several cm or even higher) is larger than the distance between the "O×P" equivalent cameras of the plenoptic cameras (several millimetres and in small cameras down to a tenth of a millimetre). FIGS. 5A and 5B (a 2D side view of cameras that can be extrapolated in a straightforward way to a 3D configuration in which the third dimension would be perpendicular to the paper without loss of generality for the discussion below) compares the baseline of a plenoptic camera ("Narrow baseline" d showing the separation d between the O×P equivalent cameras of a plenoptic camera with T×S pixels per microlens, with each equivalent camera 51 having as many pixels as microlenses in the plenoptic camera) and the "Wide baseline" B between the two cameras of a stereo-camera or a wider SAII baseline: in a practical example of a stereo camera or a SAII the "Wide baseline" B could be a few centimetres, while in a typical plenoptic camera the "Narrow baseline" d could reach values as small as millimetres or even a tenth of a millimetre. The M×N array of cameras of FIG. 4 (with Q×TR pixels per camera) is equivalent to a plenoptic system as in FIG. 1 with M×N pixels per microlens 22 and a number of pixels per equivalent camera 51 equal to the total number of microlenses in the equivalent plenoptic camera (Q×), the size of this number (Q×T) in this case (a SAII system) is much higher than the number of microlenses that can be designed in a plenoptic camera. Obviously SAII systems offer higher resolution than a plenoptic camera and the wider baseline makes it more accurate to calculate depth at large distances from the camera.

The proposed invention obtains a high-resolution depth map from a conventional camera with a single shot acquisition and, in case of video recording, the depth map is obtained in real-time. The invention uses the movement and vibrations experienced by the camera during the time a shot is performed to obtain a sequence of frames thereby simulating the several images of a SAII (or the equivalent cameras of a plenoptic camera) with the sequence of frames acquired by the moving camera. The present invention uses the distances of the camera between the chosen acquisitions as the baselines (distances between views) of a multiview system that can be used to estimate the depth of the scene. The main aim of these methods is to provide the capability to create a high-resolution depth map when only a conventional camera is available and in only one shot (with the shot involving the acquisition of several frames). The present invention is very computationally efficient, so efficient that it can be used to obtain real-time depth maps in video sequences even in low-cost mobile devices (most of the time with low cost processors operated by batteries, where efficient computations are needed to avoid draining batteries quickly).

The proposed invention has two main steps following the recording of several consecutive frames. First a step to "correct" the images acquired during the time of shooting (every image acquired with the camera in slightly different positions for x, y, z, yaw, pitch and roll) to obtain a set of "corrected images" that are related to each other as if they had been taken by a single plenoptic camera or a single SAII imaging system (a process of "Image Rectification" as in FIG. 9, or also yielding a series of images A, B, C and D in FIG. 13). This first step performs the rectification between images (as in FIG. 9) by using the recordings from the accelerometer and the gyroscope, or any other capability that can be found in any modern smartphone, automobile or moving object. A second step is applied to create a depth map using plenoptic algorithms. This consists in calculating the depth value of each point in the scene by detecting the slope of the epipolar lines of an epipolar image. In an embodiment, this calculation can be performed only for the edges detected in the scene, instead of performing it for all the pixels of the scene. The method of the present invention can process real-time video-images (around 15 frames per second and more) while previous implementations take from hundreds of milliseconds to minutes just to process a single frame.

A normal hand tremor (or physiological tremor) is a small, almost imperceptible, tremor that is difficult to perceive by the human eye and does not interfere with activities. The frequency of vibrations is between 8 and 13 cycles per second and it is a normal tremor in any person (it is not considered to be associated with any disease process). Even these small tremors can be used as a source for generating a movement on the camera capable of creating a baseline for depth detection.

Figure 7A:
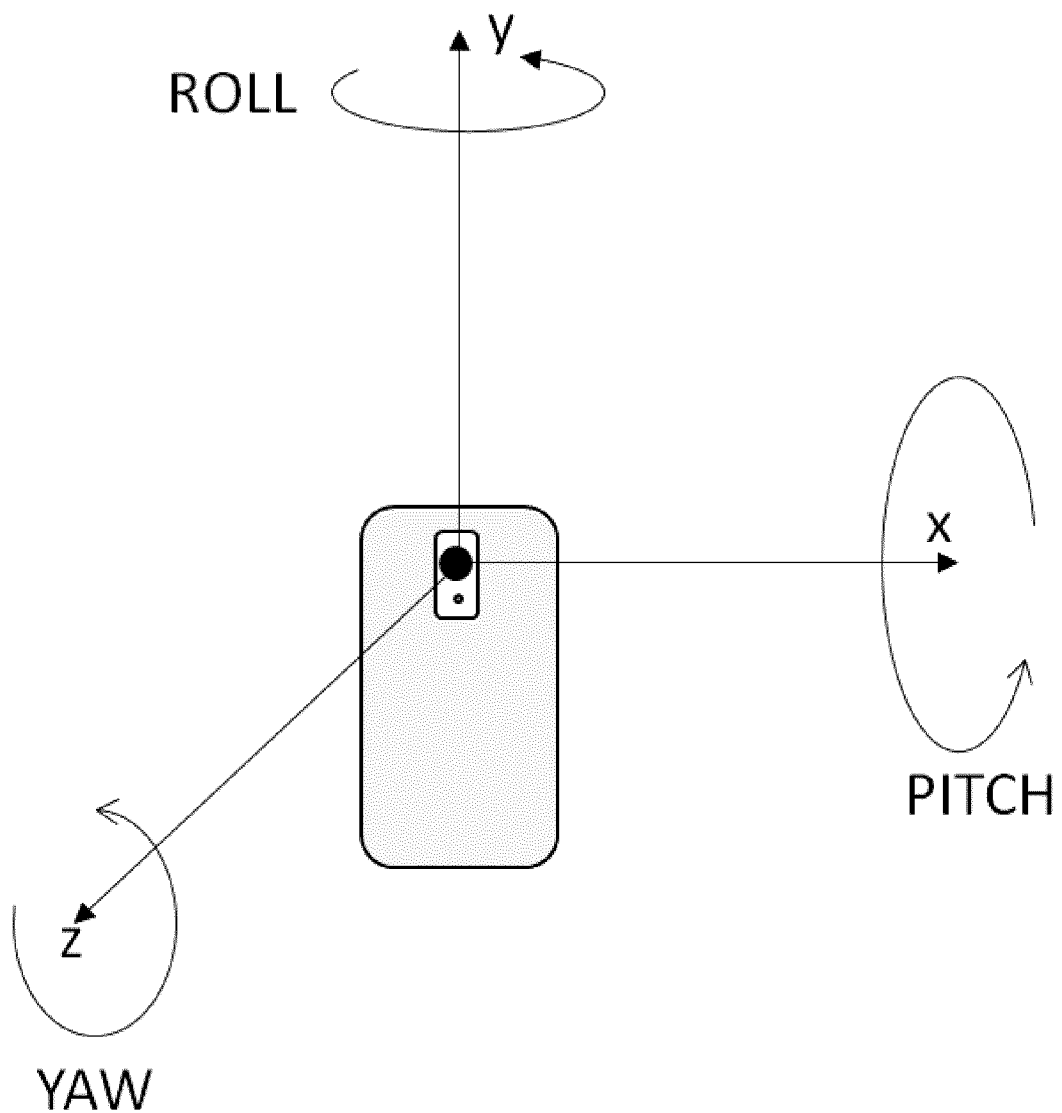
FIG. 7A shows a 6-axis reference system (x, y, z, pitch, roll and yaw) involving all the possible movements that can be recorded by accelerometers and gyroscopes in a mobile phone (or any mobile device) that includes a camera.
Figure 7B:
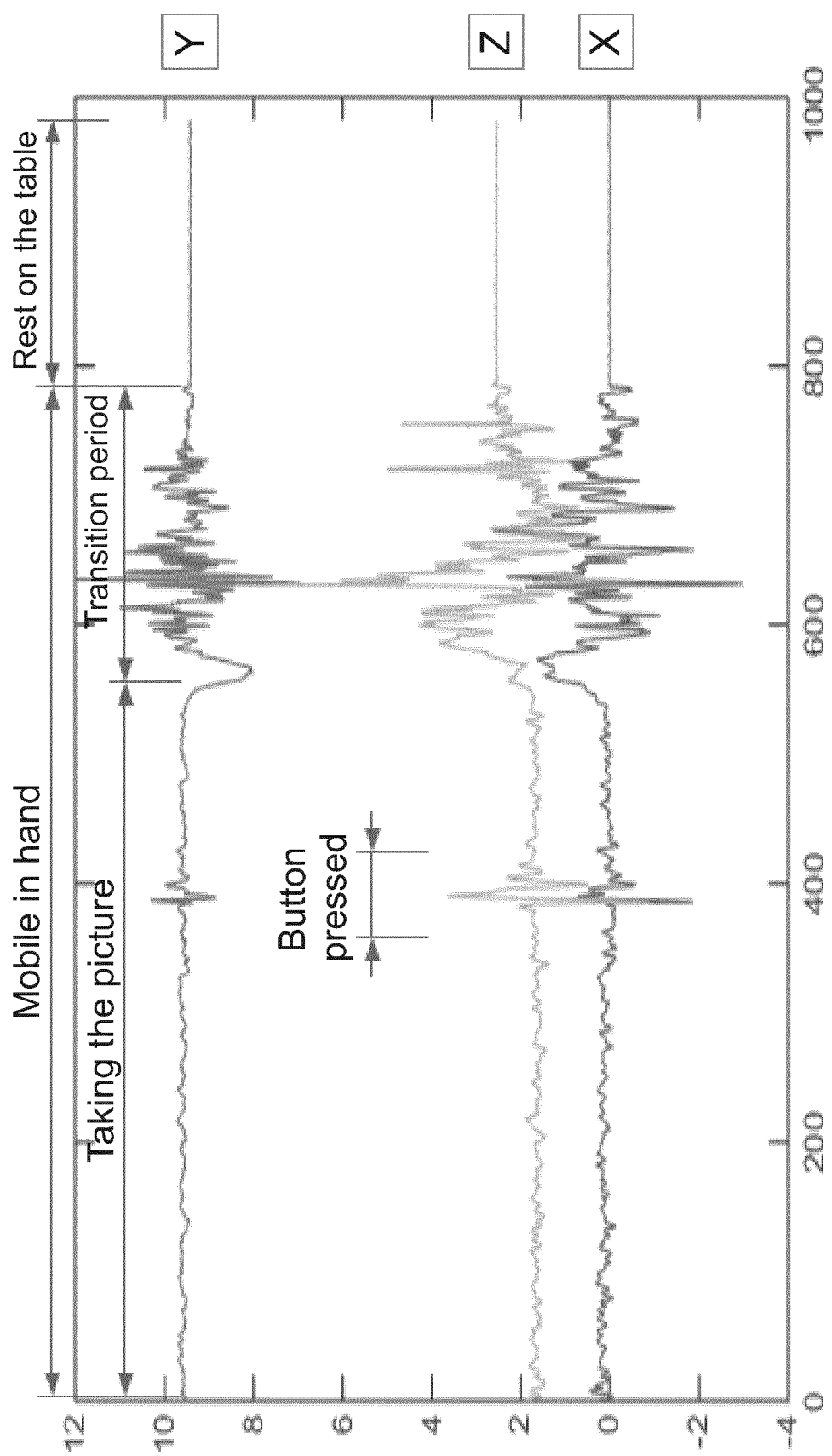
FIG. 7B shows an example of the data acquired from the accelerometer of a mobile device (accelerations in the x, y and z directions).

The most common sensors to determine the position and orientation of an object are the gyroscope and the accelerometer. They are both present in most current mobile devices (smartphones and others), and when the information is recorded by both devices simultaneously to the image acquisition process, it is possible to know for every recorded frame the exact FOV (Field of View) (in terms of the x, y, z position of the camera in the 3-dimensional world, and the direction the camera is facing to at the moment of shooting, defined by the 3 fundamental angles-pitch, roll and yaw—as described in FIG. 7A). To register movements, the normal sample rate of state of the art the accelerometers and gyroscopes is about 500 Hz, this means that the accelerometer and the gyroscope are sensitive enough to register hand tremor movements (between 8 and 13 cycles per second). FIG. 7B shows a sequence of movements registered by the accelerometer of a mobile phone in the X, Y and Z directions. It starts with the mobile placed at the hand, in a position such as if we were going to take a picture. At some time, we "press the button" (shoot the trigger) to take a picture and, after that, we leave the mobile device on the table. All the sequence takes 10 seconds with a sample rate of 100 Hz (resulting in around 1000 samples). This data can be also obtained for the gyroscope device. Although accelerometers and gyroscopes have some overlap with the information they provide, their measures have different characteristics. Accelerometers measure tri-axial (X-Y-Z) physical accelerations whereas gyroscopes measure tri-axial (P-R-Y) angular acceleration along each rotational axis, and the combination of both devices provides 6-axis motion sensing, capturing any possible movement of the mobile device for a quick and accurate determination of the relative position and orientation of the camera. These relative position and orientation parameters are used in the formation of "virtual captures" from "virtual SAII systems" (or "virtual plenoptic cameras") and to compose epipolar images as it will be explained later. FIG. 7A shows a 6-axis coordinate system associated to a camera in a mobile phone that will be used to describe movements registered by the accelerometer and the gyroscope.

Figure 13:
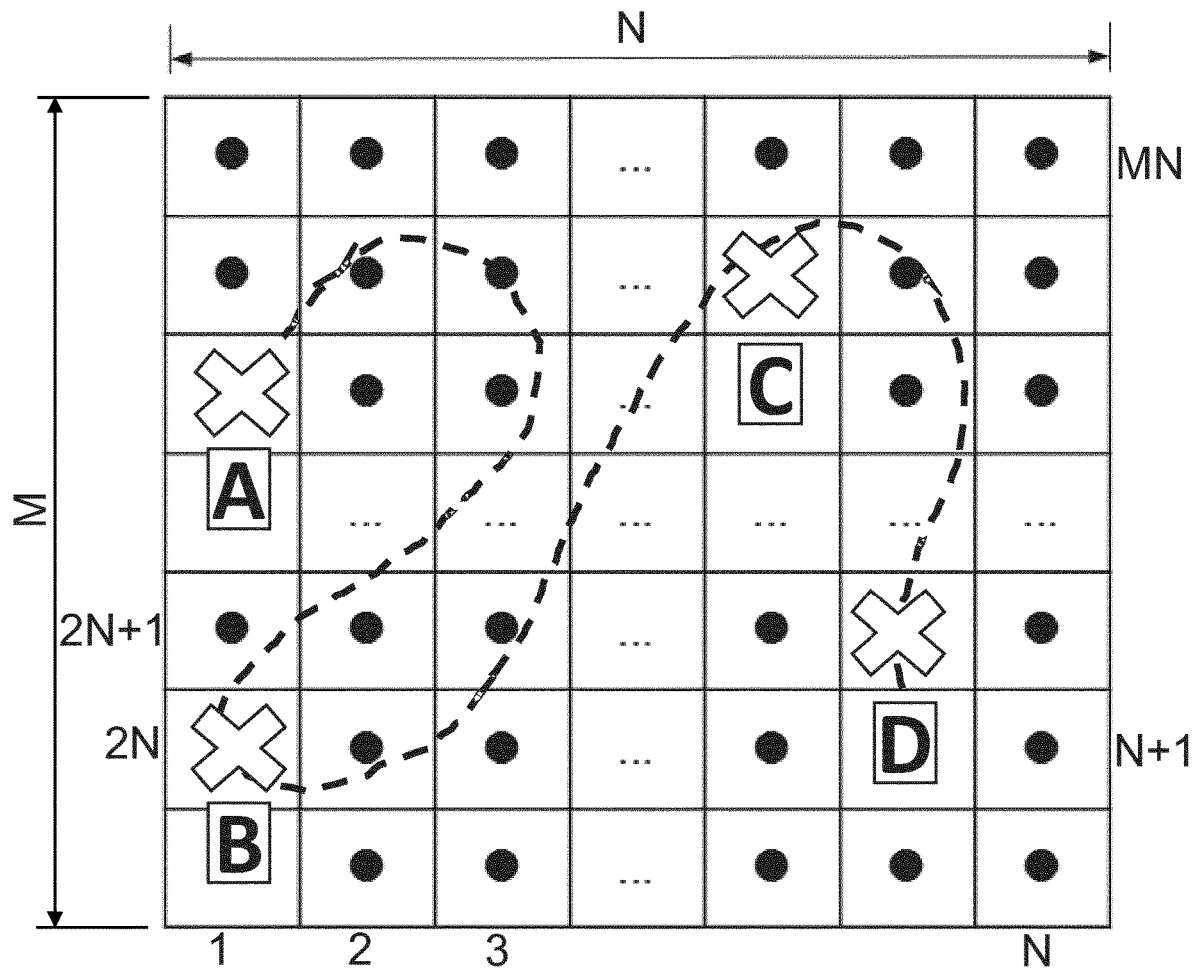
FIG. 13 illustrates a multiview system with an example of trajectory of a single camera moving through positions A, B, C and D along a bi-dimensional area of the same size as an array of M×N cameras.

Let us suppose a certain initial position of a mobile device and an image acquisition period that starts when the user presses the button to take a picture. As explained, using the data from the accelerometer and the gyroscope the relative position of the mobile device with respect to that initial position can be worked out at any time during the time of exposure of the sequence of image acquisitions happening after pressing the shutter button. FIG. 13 shows an example of a trajectory followed by the mobile device during certain interval of time. During this time, the mobile device has completed the trajectory indicated by the dashed line, and also taken images when it was at A, B, C and D positions. The example of the figure also shows an M×N matrix as background in order to compare the sequential process of image acquisition described with a virtual SAII system located at a plane nearest to the location where the shots A-B-C-D happened. Thus, if the movement of the mobile device is properly registered and processed, both systems (a SAII and the proposed invention) are functionality equivalent.

Let us now describe in detail the interval of time in which the invention is acquiring images and registering the movement of the mobile device. Most mobile devices today can acquire images with a frame rate frequency about 120 frames per second (fps), which is significantly more than what is considered as real-time (a subjective value fixed by some between 15 fps and 30 fps or higher number of frames per second). Let us suppose a mobile device of that nature that includes a conventional camera and is going to take a picture while it is held in a given position by a human hand (these are not intended to be limiting factors but examples). If we record images during 1 second, at 120 fps we could choose, for example, four images within this period with given baselines between them. Let us also suppose the trajectory shown in FIG. 13, which has been drawn in front of a matrix of M×N positions to better maintain parallelism between the proposed method and a SAII system of M×N cameras or a plenoptic camera with M×N pixels per microlens. From this trajectory that is involuntarily caused by the hand tremors we can for example select those points that maximise the total distance (both horizontally and vertically) within the trajectory. The resolution of the depth maps at long distances is improved with wider baselines and, therefore, selecting those images that are as separate from each other as possible is best to discriminate distances to the object world as large as possible. Note that the example of trajectory from FIG. 13 is a 2D simplification. To make the proposed invention work as a SAII system, the different images taken along the trajectory have to be "rectified" according to the movement parameters recorded by the accelerometer, the gyroscope or any other device of this kind, taking into account the 6 degrees of freedom (the six positions x, y, z, P, R and Y).

Figure 8:
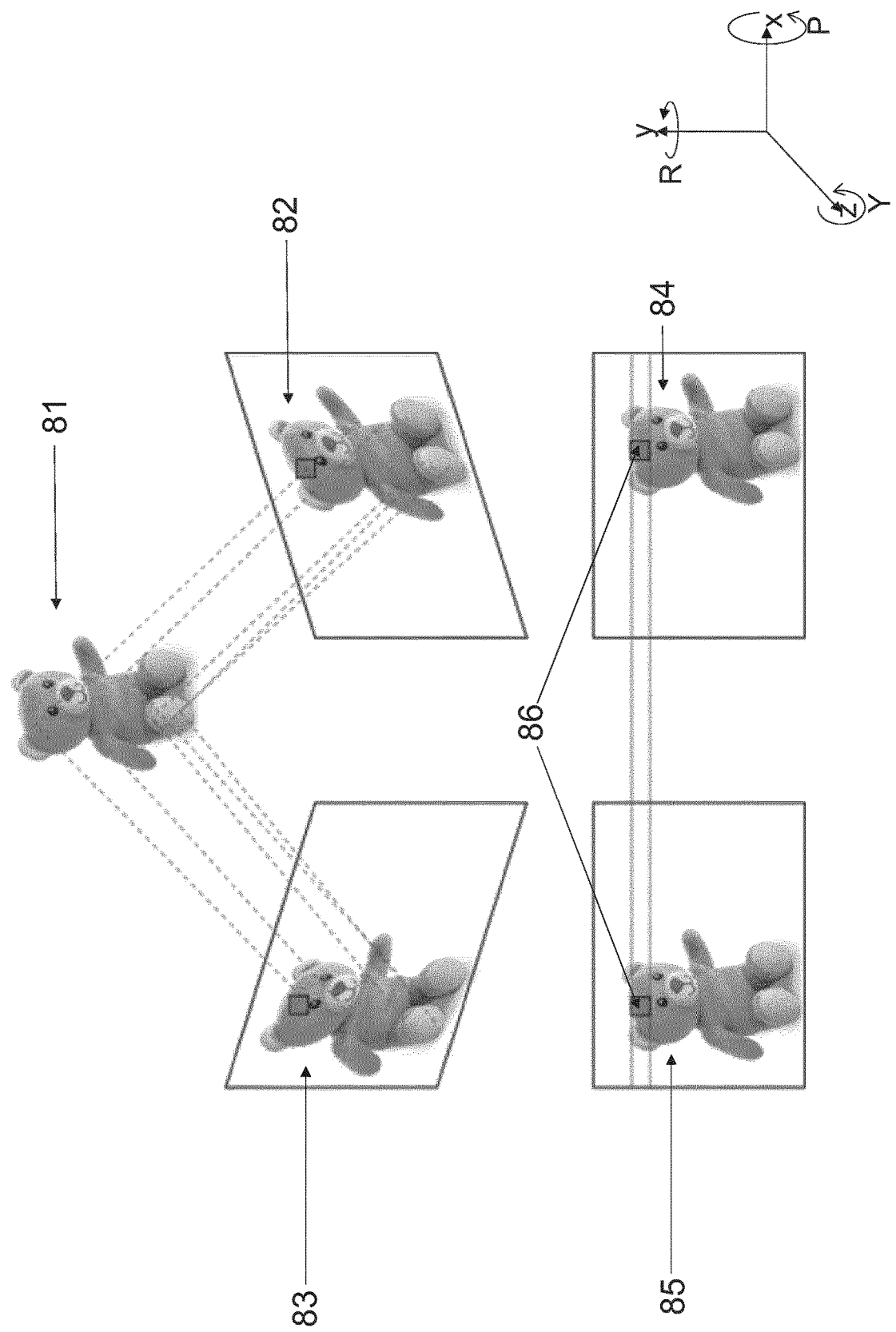
FIG. 8 shows the processes of "rectification" and "correspondence" in a stereo-pair system formed by two cameras.
Figure 9:
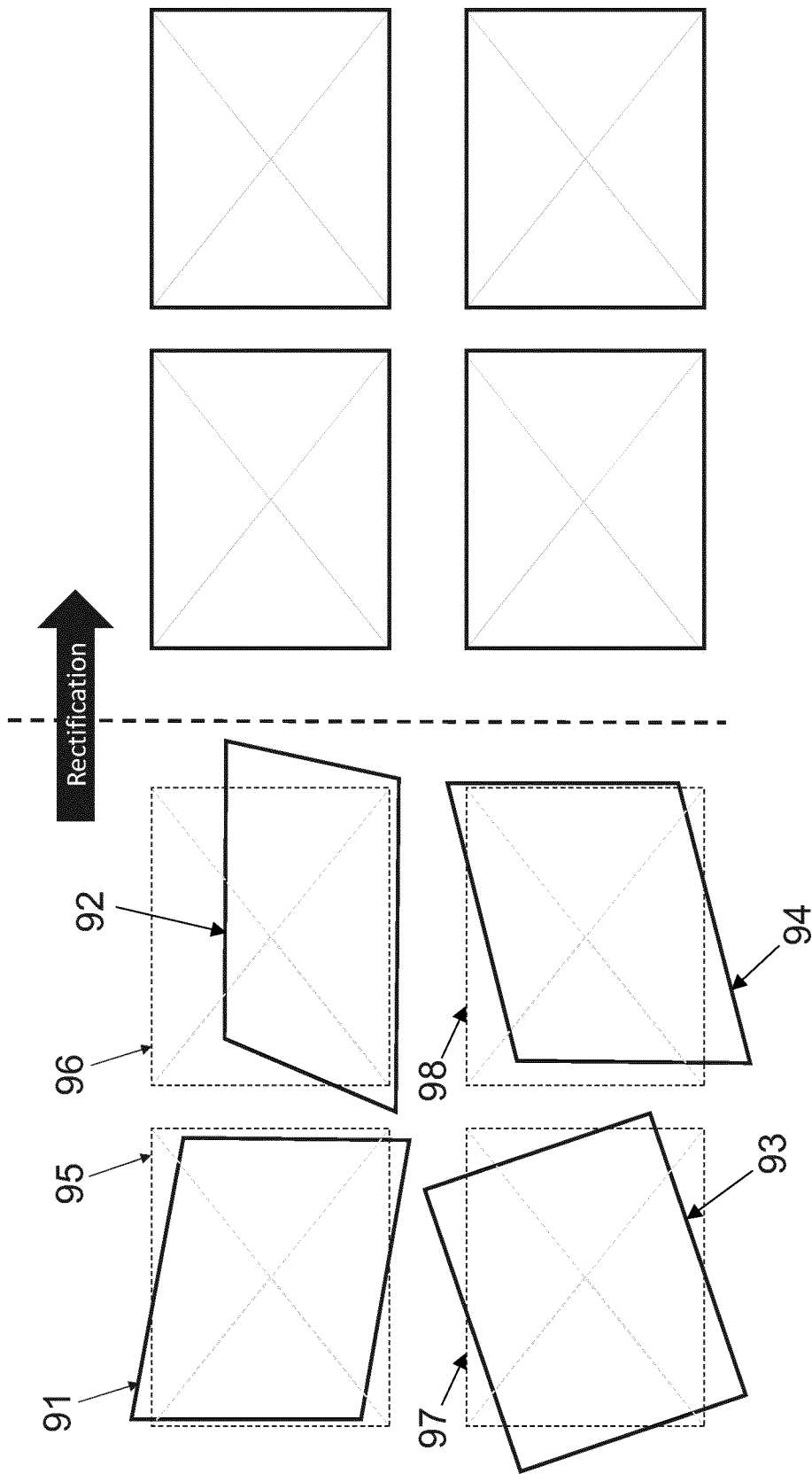
FIG. 9 illustrates the process of "rectification" for an array of 4 cameras.

Let us define how the image rectification process is performed for stereo-imaging and the differences for our invention. FIG. 8 shows how a pattern 81 is recorded by two different cameras in a stereo configuration. Pattern 81 is captured from two different points of view, recording two flat images 82 and 83. These two stereo images are "rectified" to obtain the images that would have been obtained if the two cameras had been completely aligned, that is in the same y and z position in the space, with a fix-known x distance between them, with both cameras situated in the same plane (usually known as co-planarity condition, what means that their difference in roll and pitch is zero, or that their optical axis are parallel), and with a zero yaw difference between them (equivalent to stating that both images 84 and 85 must have the same degree of horizontality). FIG. 9 shows how a camera moved by tremors of a human hand that recorded four different shots (91 to 94) at four different instants with four different positions of the camera in a five-axis reference system (x, y, pitch, roll and yaw), which is different of what would have been recorded by a SAII system with four cameras located at the dotted position (95 to 98). The process of "rectification" for this system involves computing a set of rectified images 95-98 from a set of acquired images 91-94. This is a simplified view, as it does not involve movements in z and assumes good overlap between the acquired images 91 and the place where we wish the images to be, or rectified images 95-98. Note however that the rectification in z are also very important when the camera is placed in a mobile structure such as an automobile, being this value directly proportional to its speed. A more realistic embodiment of our invention performs a sequential recording of several video frames (which for example can be 120 frames per second) and a simultaneous recording of the camera position within a six-axis reference system (x, y, z, pitch, roll and yaw).

Figure 10:
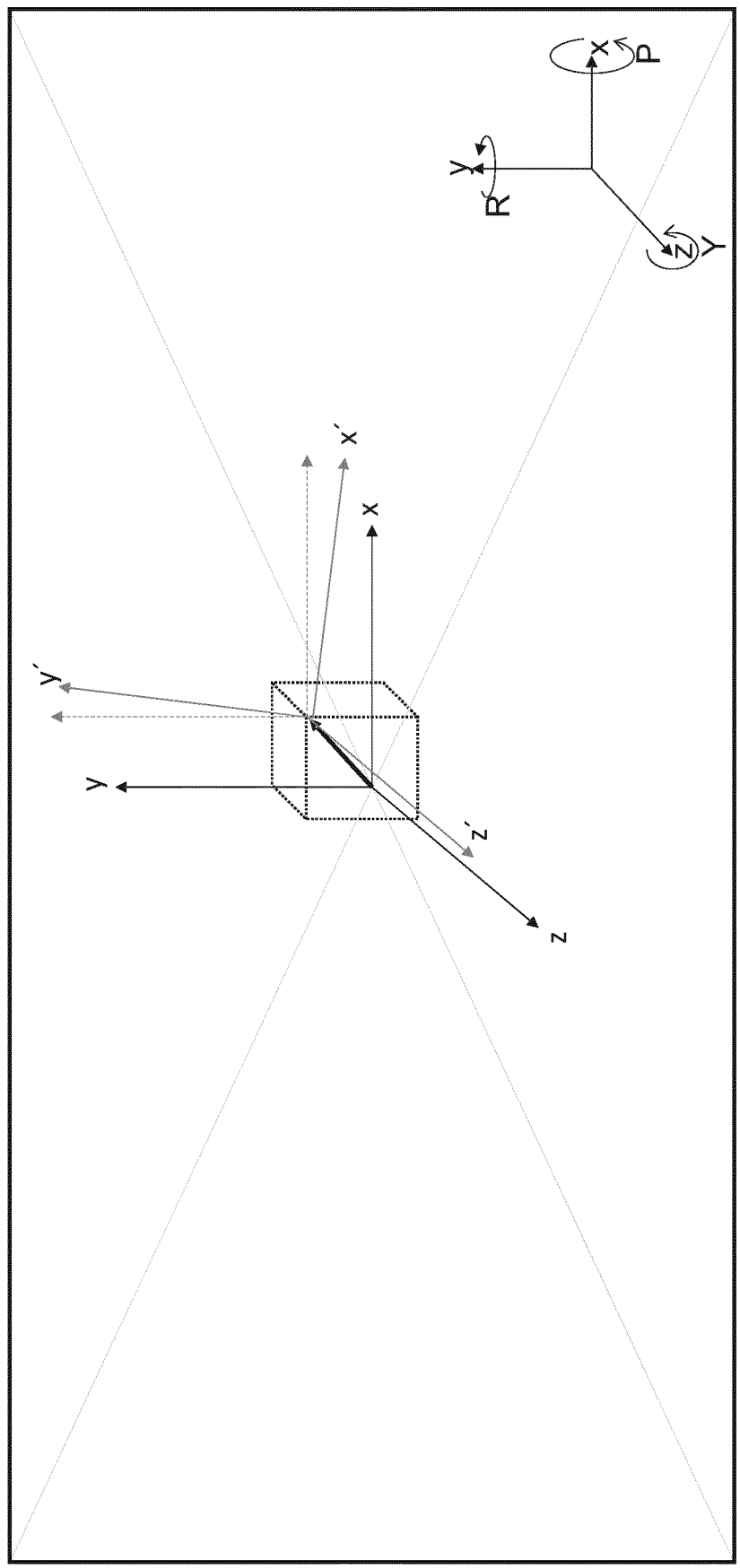
FIG. 10 shows how the 6 axis reference system associated to a given camera changes if the movement of the camera involved positive deltas in the x, y and z position, as well as a negative yaw rotation.
Figure 11:
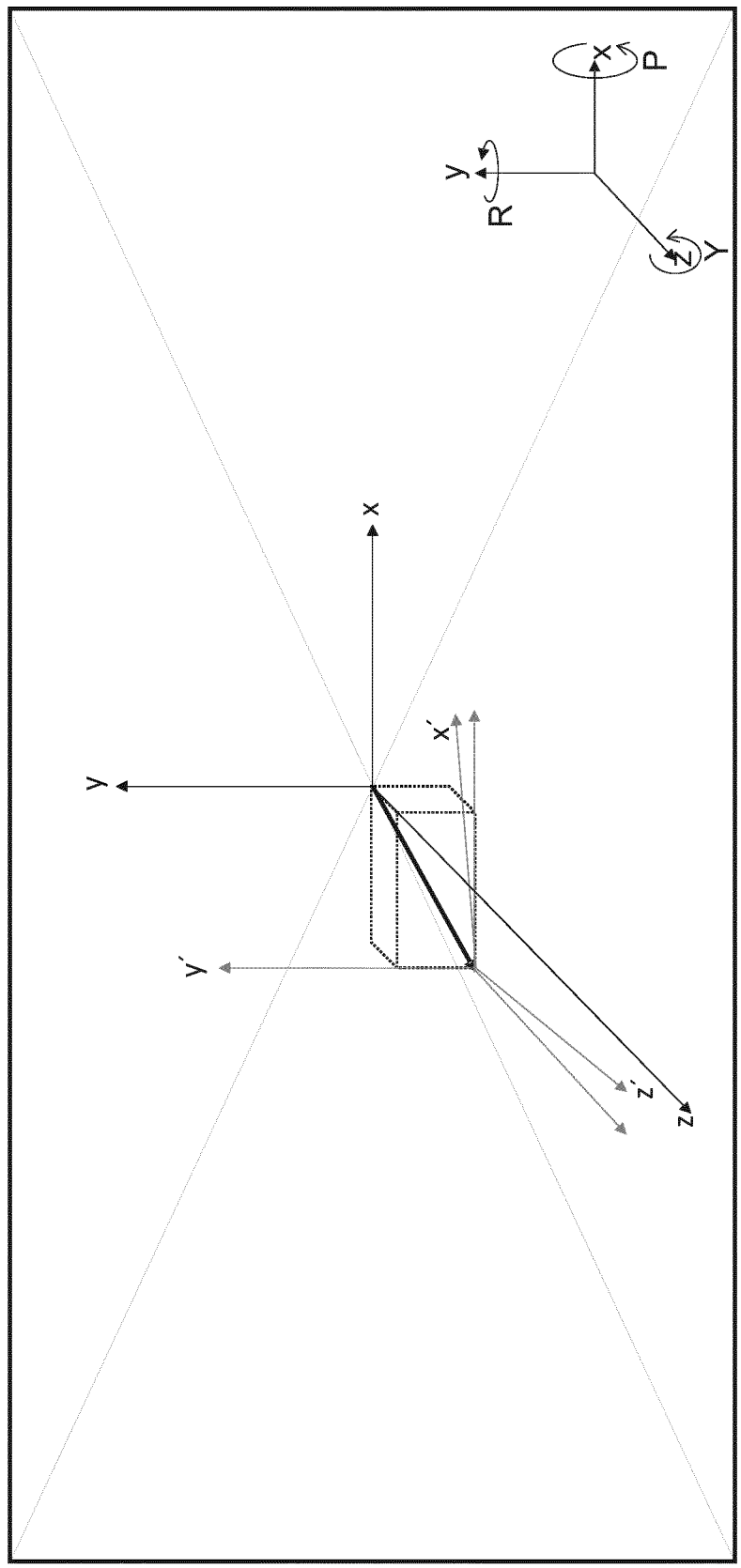
FIG. 11 shows a change in the camera reference system for a negative translation in x and y, a positive translation in z, as well as a positive roll rotation.
Figure 12:
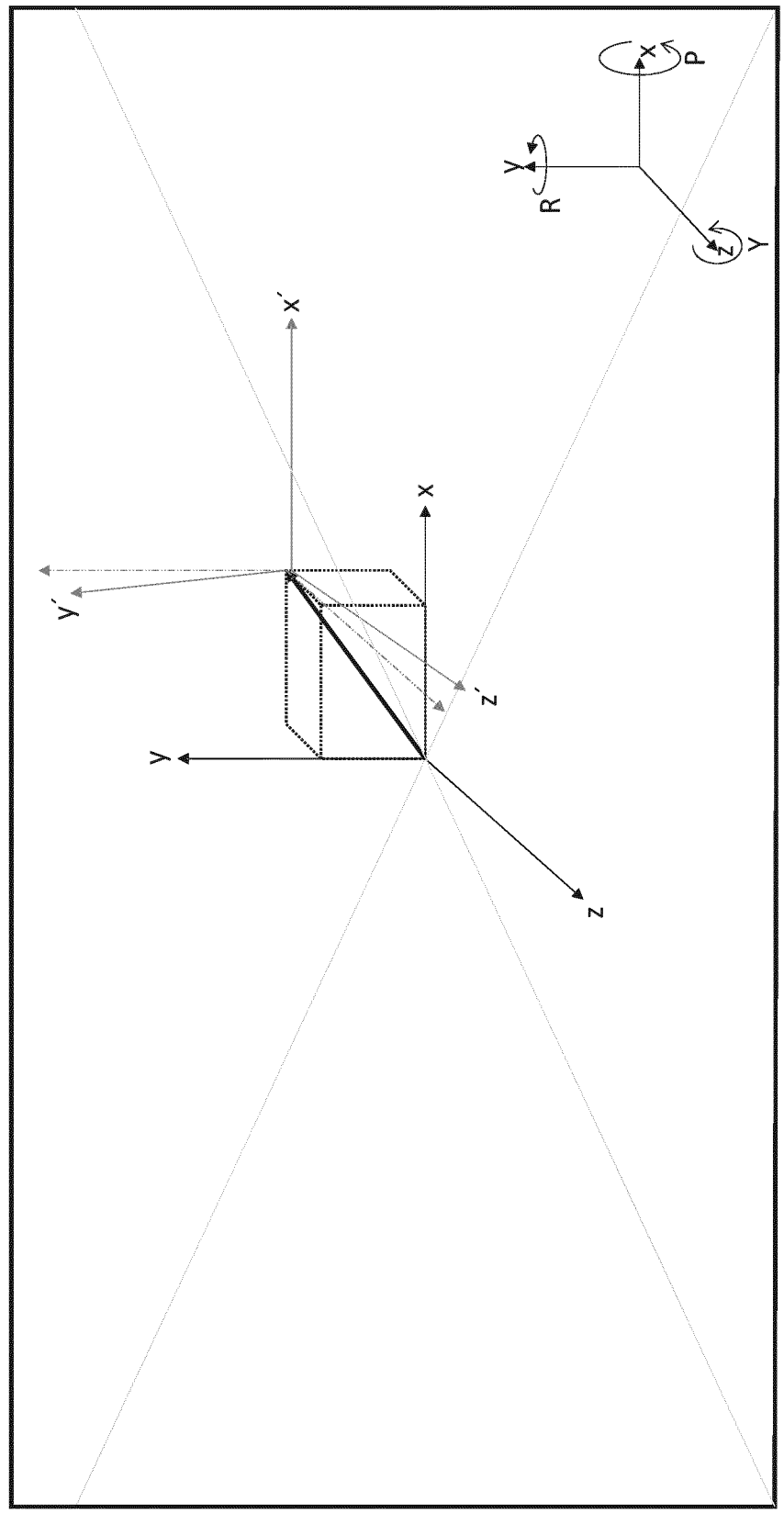
FIG. 12 shows a change in the camera reference system for a positive translation in the x and y directions, a negative translation in z, as well as a positive rotation in pitch.

This is exemplified in FIG. 10: at a given time the camera captures a frame, at that moment the camera is located with its associated 6 axis at a given location in the space (x, y, z, pitch, roll and yaw), when the camera captures the following frame the six axis reference system moved to a new place which is known because its new position (x', y', z', pitch', roll' and yaw') has been recorded by the accelerometer and the gyroscope associated to the camera. In this particular example of FIG. 10 we had three positive movements in x, y and z, as well as a negative yaw rotation. FIG. 11 shows another example in which between the first frame and the second frame x and y had a negative movement, z a positive movement, as well as a positive yaw rotation. FIG. 12 is yet another example in which between first and second frame the movements in x and y were positive, z negative as well as a positive pitch rotation.

Figure 14:
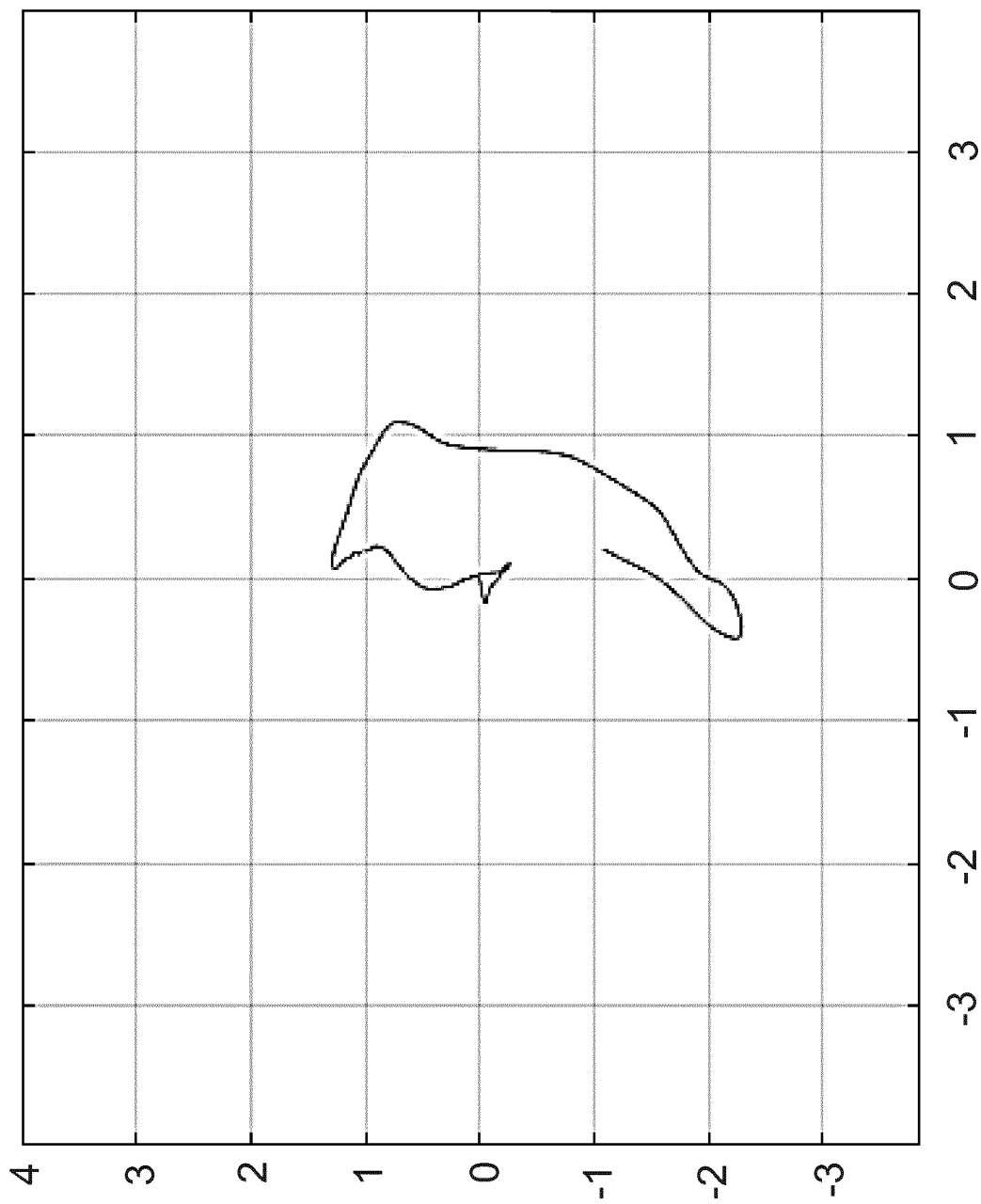
FIG. 14 shows a 2-seconds recording of the space movements (in millimetres) detected by accelerometers from off-the-shelf smart-phones in the x and y directions while the phone is held by a human to take a picture.

Let us compare the timings needed and what is technologically feasible to achieve our purpose. Hand tremors exhibit low frequency movements of 8 to 13 cycles per second, during that second 120 shots can be taken by state-of-the-art camera systems and photo-sensors, and during that second 500 readings can be sampled by state-of-the-art accelerometers and gyroscopes. FIG. 14 is a recording during 2 seconds of the space movements detected by accelerometers from off-the-shelf smart-phones in the x and y directions (z direction and typical yaw, roll and pitch can also be recorded and used in the computations), in this particular case of FIG. 14 the phone is held by an amateur rifle user (for a normal person the movements are is slightly larger, for a person suffering Parkinson's disease movements are much higher), the figure shows a range of movements of nearly 4 millimetres in the x-axis (vertical in FIG. 14) and nearly 2 millimetres in the y-axis (horizontal in FIG. 14). These displacements are larger than the typical "Narrow Baseline" d of separation between equivalent cameras of a typical plenoptic camera (an entry pupil of 2 millimetres and 10 pixels per microlens yields a minimum baseline ("Narrow Baseline" d in FIG. 5A of 0.2 mm); or if we compare a typical baseline d of a plenoptic camera of 0.1 to 0.3 mm, the FIG. 14 shows that the same baseline is likely to happen every 100 to 200 milliseconds if produced by hand tremors. That is why the proposed invention needs about 200 ms to acquire sufficient images and data to create a depth map of the scene. Within an embodiment capturing images at a typical frame rate of 120 fps within a time interval of 200 ms the invention acquires 24 frames. These frames are taken while the mobile device is in motion due to hand tremors or any other vibration. From these 24 frames, those 2 frames with longest baseline between them can be chosen, being this baseline long enough to improve the quality of the depth map of a multiview camera in terms of the accuracy obtained for longer distances.

Once several images and their corresponding movement parameters (x, y, z, P, R, Y position) have been captured with a conventional camera as the camera is moving in the 3D space for a certain period of time, the equivalent SAII (or equivalent plenoptic camera) is created by rectifying all these images according to the movement parameters (new positions in the 6 axis reference system). Then, epipolar images 300 and 302 are formed and plenoptic algorithms are applied to generate a depth map of a scene.

One feature of plenoptic cameras is that the maximum disparity between consecutive equivalent cameras is +−1 pixel, implying that the pixels that form an epipolar line are always connected to each other. Hence, in order to properly apply plenoptic algorithms to the created equivalent SAII (or equivalent plenoptic camera), the baseline between consecutive images must ensure that no gaps are created when forming the epipolar images. Nevertheless, this is not always possible to ensure since the human-tremor movements in FIG. 14 are sometimes polluted by atypically large movements that cannot be modelled as SAII systems (or plenoptic cameras) but they are extremely beneficial to enlarge the baseline and hence beneficial to compute large distances in the object world with very high reliability. These atypically large movements can be artificially produced for example by recording the frames that happen when the user is starting to put the phone away, or by somebody accidentally hitting the arm of the person taking the photo, or by the large vibrations of a selfie stick (that obviously produce movements larger than in FIG. 14); and are better modelled by a novel device also part of this disclosure: a stereo-plenoptic device 5200 (FIGS. 5A and 5B) including at least a plenoptic camera 100 and at least one conventional camera, but in a preferred embodiment shown in FIG. 5B we added to the plenoptic camera 100 two conventional cameras or plenoptic cameras 1304 (or a conventional camera and a plenoptic camera). Prototypes of this device have produced the evidence that the device makes sense by itself (for example in a mobile phone as in FIG. 5B) and also to model atypically large camera movements that cannot be modelled by a plenoptic camera or a SAII system, movements that are especially welcome to calculate large distances to very distant objects in the world. It is also worth noting that hand tremors as in FIG. 14 are typical when the user is trying to hold the camera in place as quiet as possible, however the movements on the instant after pressing the shutter are much larger but still beneficial because they are still facing the same FOV—Field of View—but the baseline may be increased several centimetres, yielding much better estimations of distance. Also, the statistical distribution of the movements in the x and y direction in FIG. 14 exhibits usually a large peak-to-average ratio (most of the time the movement is within millimetres, but once in a while there is a sample or several samples moving up to several centimetres), what is beneficial to improve the baseline and is better modelled through a stereo-plenoptic device as in FIG. 5B since in this case the vertical and/or horizontal epipolar images have large gaps between the several rows (captured images) as in FIGS. 6A and 6B.

Figure 6A:
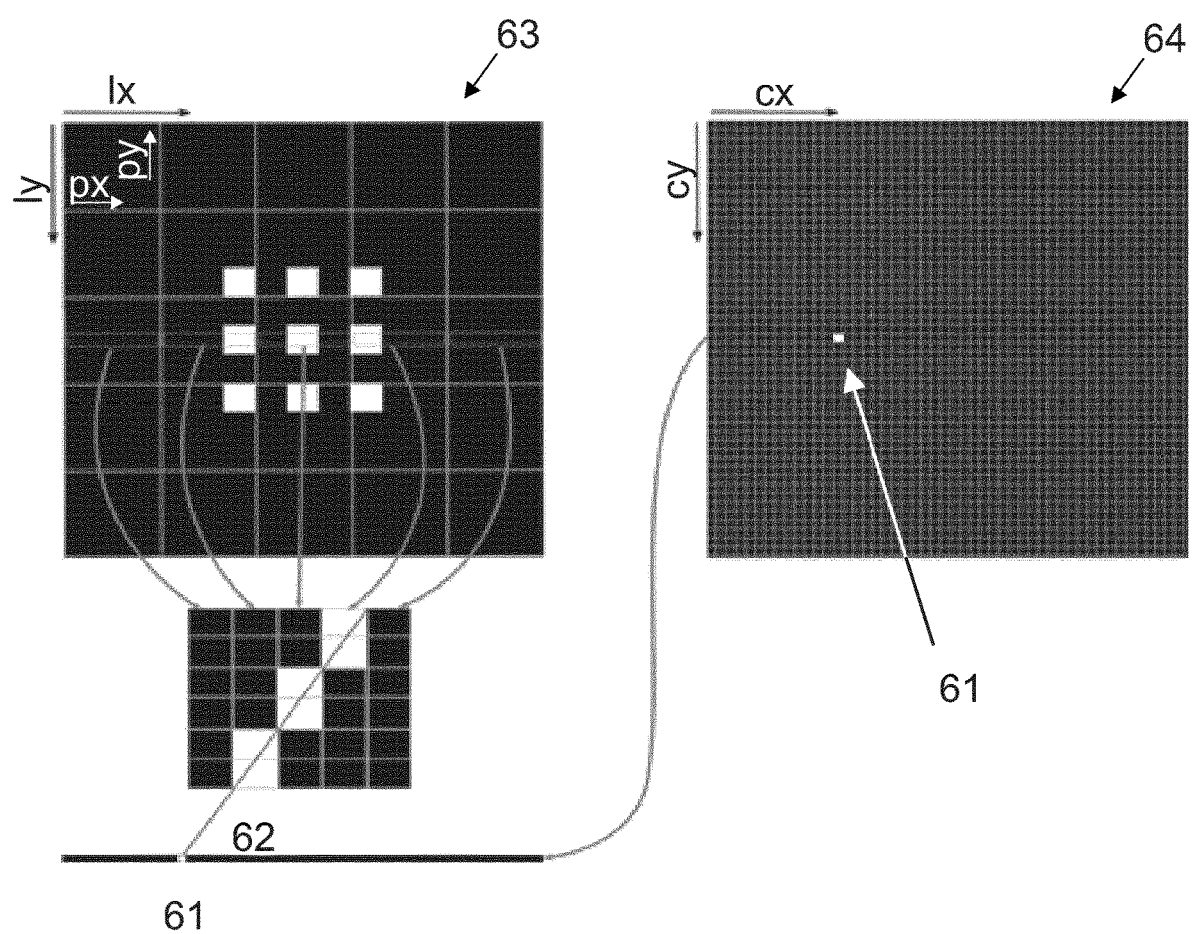

The embodiment in FIG. 5B is a novel combination of two of the technologies just mentioned (plenoptic and stereo) to create a depth map, that goes well beyond previous art (as it includes plenoptic cameras mixed with conventional cameras or with other plenoptic cameras in a Multiview configuration: a superset that can include more cameras than in FIG. 5B). FIG. 5A shows a basic configuration of a stereo-plenoptic device, a multiview system that significantly enhances the accuracy of depth estimation of plenoptic cameras for large distances due to the addition of a conventional camera looking at the same FOV (Field of View) as the plenoptic camera. This invention and its methods for real-time depth estimation are composed by at least a light field plenoptic camera and includes additional conventional or plenoptic camera(s). Such a multiview system, with the appropriate image processing methods, is able to create a depth map of the scene with a very high-quality resolution, overcoming the drawbacks of plenoptic cameras (restricted by unreliable depth measures for large depths) and of multi-camera systems (that need much higher processing power). This multi-perspective invention is at the same time extremely efficient in terms of computational requirements. FIG. 6A shows a recording of a plenoptic device (at the left) where an epipolar line 62 within and epipolar image from the plenoptic device is combined with the resulting image of a conventional camera (right side) that has much higher resolution. This FIG. 6A also shows how a point of the conventional camera 61 as for example the bottom camera of FIG. 5A (or the right or top cameras of FIG. 5B) is used to extend the baseline of the plenoptic camera with an image of a conventional camera (as for example the bottom camera of FIG. 5A or the camera 1304 in FIG. 5B), what yields better distance estimation capabilities and performances for the combination of both cameras than for the plenoptic camera by itself. One of the main advantages of this embodiment is the use of plenoptic algorithms for depth estimation (much more computationally efficient than stereo-matching), which are also used in the present disclosure as described below. An additional advantage of this approach is that the lateral resolution of the Multiview system can be the lateral resolution of the conventional camera (usually much larger than the lateral resolution of plenoptic cameras), and that it is possible to compute light fields with as many points as points in the conventional camera(s).

FIG. 6B is an embodiment of a method of how the "rectification" of the conventional camera(s) 1304 is performed to match its images with the plenoptic camera 100: an epipolar line 1404 is detected within an epipolar image 400 of the plenoptic camera 100; the distance B between central view 1516 of the plenoptic camera 100 and the conventional camera(s) 1304 is straightforward from the plenoptic camera 100 in FIGS. 5A and 5B, is obtained based on the relation between the "Wide baseline" B between the plenoptic camera 100 and the conventional camera(s) 1304 and the "Narrow baselines" d of the plenoptic camera 10 in FIGS. 5A, 5B and 6D; the distance H is chosen to match the common part of the FOVs—Fields of View—of the plenoptic camera 100 and the conventional camera(s) 1304; the epipolar line 1404 of the plenoptic camera (a set of connected pixels in the epipolar image 400 of the plenoptic camera 100, that by definition marks an edge of the object world) is drawn linearly (1506) to reach the intersection with the row of pixels 1406 of the conventional camera(s), intersecting the sensor of the plenoptic camera in pixel 1504, however in most of the cases the pixel 1504 (sampled by the conventional camera(s)) does not match the "edge patterns" sampled by the plenoptic camera 100, that is why a search area 1512 in the conventional camera(s) is defined to finally find the pixel 61 of the conventional camera(s) 1304 that matches the edges detected by the plenoptic camera 100. Through this method we increase the number of views 1510 of the plenoptic camera 100 captured the equivalent cameras 51 of the plenoptic camera 100 with additional views(s) of conventional camera(s) situated at distance(s) from the plenoptic camera much larger (centimetres or even more) than the usual separation between views of the plenoptic camera (about tenths of millimetres), enhancing drastically the baseline (from d to B) and hence the precision of measurements of depth for long distances from the camera(s). This can be summarized with the help of FIG. 6B as follows: the narrow separation "d" between the views 1510 of a plenoptic camera 100 would need very large increments in depth of patterns in the object world to produce very small variations of slope of epipolar lines 1404, however by adding additional view(s) 1406 from a conventional camera(s) or from additional plenoptic cameras 1304 it is possible to fine tune very precise "slopes of extended epipolar lines" 1508 that offer higher precision depth measurements for long distances.

FIG. 5B shows an embodiment of a device from this invention within a mobile device: a plenoptic camera 100 associated to two conventional cameras (or associated to a conventional camera and a plenoptic camera, or associated to two additional plenoptic cameras) 1304, one horizontally aligned and the other vertically aligned in order to improve baselines in both directions (x and y), while at the same time saving the high computational requirements from stereo and Multiview image matching by using a small search area 1512 (that can be one or two-dimensional). It is evident for an expert in the field how to modify/extend this device to have several different options: only a plenoptic camera and a conventional camera, only two plenoptic cameras, three plenoptic cameras, any array of cameras including at least a plenoptic camera, etc.

The scenario illustrated in FIGS. 6A and 6B (image[s] 63 captured by a plenoptic camera, and image[s] 64 of the same scenario captured by a conventional camera) is equivalent to a single conventional camera that has captured several images at slightly different positions within small distances from each other and an additional image captured by the same conventional camera at a position quite distant from the rest. As shown in FIGS. 6A and 6B the epipolar image formed has gaps d between the images captured (where d in a plenoptic camera is the size of the entry pupil divided by the number of pixels per microlens in one dimension [x or y]). If the gap B (between the central view of a virtual plenoptic camera and the equivalent view of the conventional camera 1304 simulated by a moving camera) is larger than the distance D between the central view of the plenoptic camera (or a virtual plenoptic camera simulated by a moving camera) and the extreme view of the said plenoptic camera (i.e. four times d in the example of FIG. 6B) it is possible to create a virtual stereo-plenoptic equivalent system. The key criteria to create either an equivalent SAII (or equivalent plenoptic system) or an equivalent stereo-plenoptic system with wider baseline is to have at least one large baseline (i.e. among the distances between adjacent images) that is larger than d, if the baseline is smaller than the distance d a SAII equivalent system is recommended. Also, a SAII equivalent system will be selected if the baseline B is smaller than the distance D. That is to observe if in the epipolar images from FIG. 6B there is at least one large gap (B-D) (larger than the small gaps d), requiring to define a search region 1512 and look for the corresponding edge point 61. On the other hand, in the case that all the baselines are equal or smaller than d, the rows of epipolar images are in contact such that correspondence algorithms (between the different rows of epipolar images) are avoided and plain plenoptic algorithms are applied.

Please note that in a device as in FIG. 5B the number of microlenses in a plenoptic camera is usually smaller than the number of pixels in the associated conventional camera, however in the invention where the plenoptic views 1510 are different views extracted from a moving camera the number of pixels of the views 1510 equals the number of pixels of the equivalent camera at a baseline B.

In an embodiment, the way to determine whether the equivalent system to create is a Virtual plenoptic system (that can also be modelled by a Virtual SAII system) or a Virtual stereo-plenoptic system depends directly on the largest distance between consecutives captured images (consecutive in the space domain or adjacent images), such that this largest distance is larger than d, being d the maximum distance between "chosen captured images" of a virtual plenoptic camera that ensures that the maximum disparity between said "chosen captured images" is one pixel.

The captured images are classified by connecting in the x and y dimension each of these images with their adjacent images forming a grid. If all the distances between connected images are equal to or smaller than d (disparity smaller than one pixel) said images can be used to compose a virtual SAII (or equally a virtual plenoptic camera). On the other hand, if one or more images are captured at distances in the x or y direction larger than d, those images 64 can be used to compose additional views 1406 of a Virtual Stereo-Plenoptic system as in FIGS. 6A and 6B.

In an embodiment, in order to determine which images among the all captured ones are consecutive to each other, the x and y coordinates are used to create a grid like in FIG. 13. Then, the "chosen consecutive image" (in the space domain) of a certain image is the one that is located at the minimum distance (in the x and y direction) from said certain image, but always at a distance shorter than d.

The "rectification" process described above for the conventional cameras vs the plenoptic camera, even if it makes sense for the device in FIG. 5B and similar devices, is an oversimplification of what happens when the cameras 1304 are not physical cameras but "virtual cameras" that shoot different exposures from different points of view from a real moving camera. In FIG. 6B we just made an image "rectification" for baseline (B) and a "rectification" H to match the common part of the FOVs of both cameras (100 and 1304); if 1304 was a virtual camera that has moved several centimetres with movements larger that the millimetres due to human tremors while the user is purposely trying to hold the camera as quiet as possible (as in FIG. 14), the "rectification" process, instead of the baseline B and the Field of View H has to consider random movements in the 6 axis (x, y, z, yaw, pitch and roll) that can be determined considering that the accelerometer, the gyroscope, or any other positioning device associated to the camera recorded the new position (x', y', z', yaw', pitch' and roll') were the virtual camera 1304 captured the image a certain amount of time after the plenoptic camera 100 captured the first image. In a different embodiment, the camera 100 is not a physical camera but a "virtual plenoptic camera" (or Virtual SAII system) that captured several shots (as in FIG. 13: shots A, B, C, D) due to hand tremors as in FIG. 14.

Figure 16A:
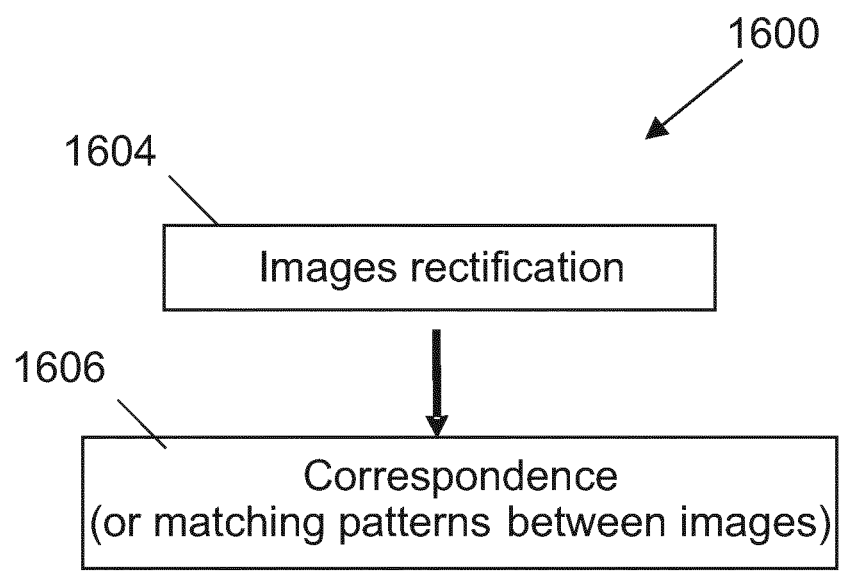
FIG. 16A shows a process of Stereo-camera image rectification and correspondence.

FIG. 16A shows a first procedure (1600) related to stereo-camera imaging. This figure shows a simplified process 1600 assuming a fixed (known) position of stereo cameras (that is known from the calibration process of the two stereo-cameras). This procedure comprises image rectification (1604) which is simple given the known position (and orientation) of the two cameras and a second step of correspondence (1606) which implies matching the patterns which are common to the two acquired images, obviously the matching procedure between pixels of the two cameras is different depending of the object world distances of the sources of light that produced the patterns in both cameras, or in other words, an object-point in the world very far away from both cameras will produce practically zero disparity between its two images in the two cameras, while an object-point very near the cameras will produce a very large disparity in the sensors of the two cameras.

Figure 16B:
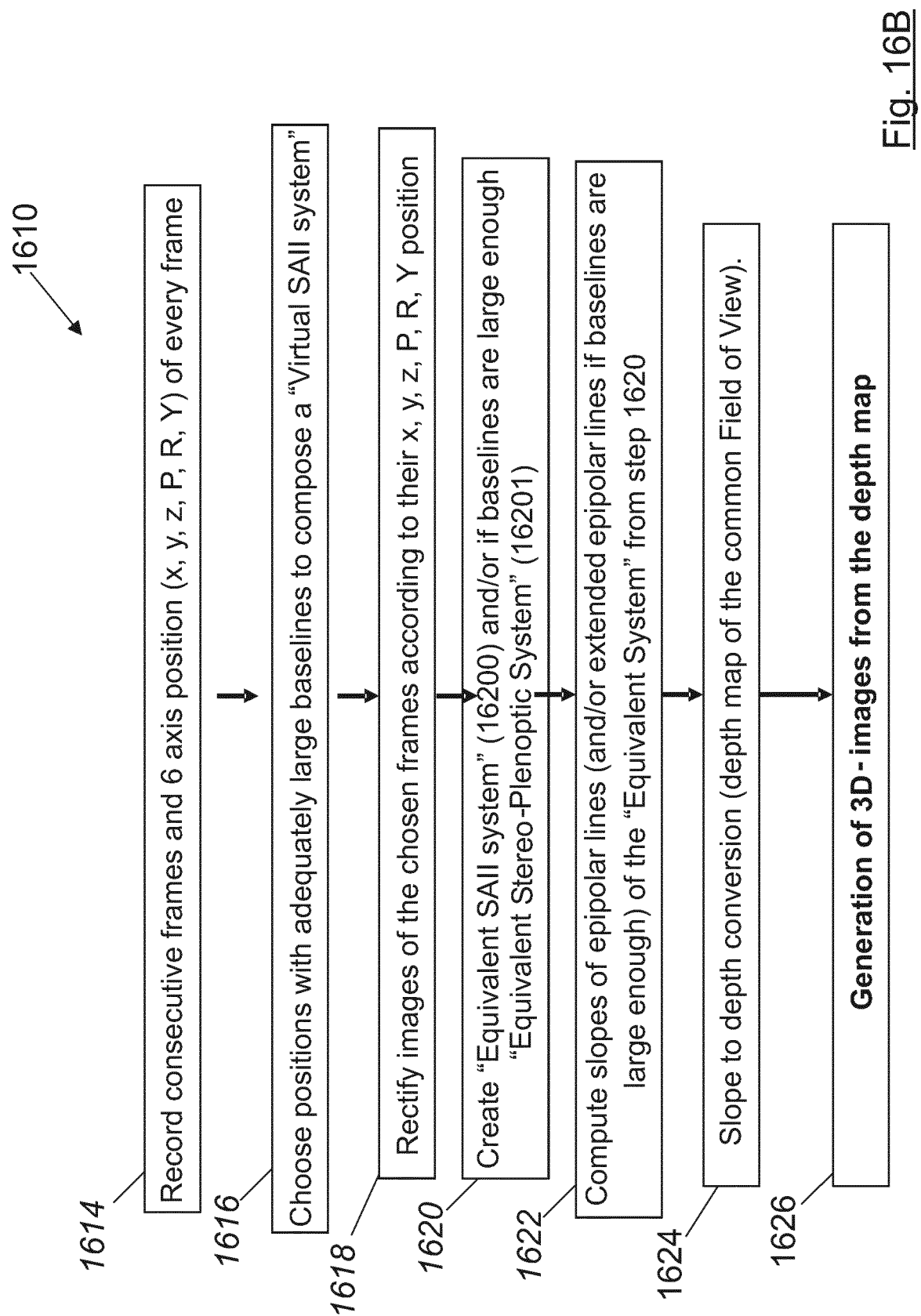
FIG. 16B shows a method to calculate a depth map according to the invention in this disclosure.

A second procedure (1610) according to the present invention is described in FIG. 16B. This procedure comprises: a step 1614 recording consecutive frames (for example at 120 fps-frames per second), simultaneously recording the 6 axis position of the camera (x, y, z, P, R, Y) for every one of the "frames recorded" (at 120 frames per second and for example recording the 6 axis position sampled at approximately 5 positions per frame or 600 samples per second); the next step 1616 chooses the positions with adequately large baselines d (as for example positions A, B, C and D in FIG. 13, positions that might be different for an "Olympic pistol shooter" than for a person suffering Parkinson's disease) to compose a "virtual SAII system" (or a virtual plenoptic camera) and in case they exist, also positions with adequately "Larger Baselines"-D to compose a "virtual stereo plenoptic system"; a third step 1618 rectifies the chosen shots or frames as in FIGS. 8 and 9 but to the rectification depends on the 6 axis positions of the camera (different values of x, y, z, pitch, roll and yaw for each of the shots chosen in the step 1616); a fourth step 1620 creates the equivalent SAII system (or the equivalent plenoptic camera) for the shots we have chosen and/or if some of the displacements in the x and/or y directions are atypically large an equivalent stereo-plenoptic system as in FIGS. 5A-5B (but most likely with quite different values of z, pitch, roll and yaw for the equivalent camera with the "Wide baseline" B, as the cameras in FIGS. 5A and 5B are aligned and co-planar, which is not likely to be the case with moving camera(s)). Once the equivalent system is created (in step 1620 of FIG. 16B) it is possible to perform an additional fifth step (1622) aiming to calculate distances to the objects in the world following the traditional epipolar line slope analysis (as in FIGS. 3A-3C), or the extended epipolar line analysis (as in FIGS. 6A and 6B) if the baselines are large enough (at least one of the images is at distance in the x and/or y direction larger than d from the "set of connected images" [wherein the distance of every image within the "connected set" is equal to or lower than d from its nearest images within the "set of connected images"]), obtaining a slope-map of the images of the common FOV—Field of View—of all the cameras of the "Equivalent System" of step 1620. The slope of the epipolar lines obtained before can be further used to obtain a depth map through traditional epipolar slope to depth conversions (step 1624), obtaining a depth map of the images of the common FOV—Field of View—of all the cameras of the "Equivalent System" of step 1620. It is possible to create 3D-images (step 1626) from the slope and depth maps from previously computed, 3D images compliant to any 3D format (stereo-images, integral images, etc.)

The robustness of the proposed process has been experimentally demonstrated with different users and devices and at different times of the day. In addition, all the experimentation has been repeated several times to avoid the stochasticity of the process.

In a particular embodiment, the input of images to the invention can be a video sequence: let us suppose a video sequence that is captured at 120 fps and we want the invention to use 4 frames (4 images) to compute the depth values of the scene. This will mean that the system will produce depth maps (or 3D images) at around 30 fps (considered by most as real-time). The frames selected to compute the depth map (or to compose a 3D image) are those that exhibit a baseline wide enough, not necessarily consecutive frames.

So far, the process of "registering" two or more images taken by a mobile device using the data from the accelerometer, the gyroscope, or any other positioning device has been described. Let us remind that the registration process involves image "rectification" (to guarantee that the 2 or more images acquired are "re-computed" to become comparable co-planar images, as in FIGS. 8 and 9) and the "correspondence" or "pattern matching" (exemplified in FIG. 8 by searching the common pattern 86). The "correspondence" or "pattern-matching" in SAII, in plenoptic cameras and in an embodiment of this invention is performed by identifying the epipolar lines within the epipolar images).

In another embodiment, the process can be performed within a time range in which the described procedure can be considered as a real-time process.

The movements registered by the mobile device are good enough to obtain a robust depth map. To this end, we will compare again the baseline obtained by the sub-apertures of a plenoptic camera with the baseline obtained by the proposed invention.

The baseline of a plenoptic camera is the distance between the centres of two consecutive sub-apertures (the distance d between the centres of two equivalent cameras 51 in FIG. 5B), and the size of the baseline (as well as the maximum diameter 2D) is directly related with the maximum distance to the object world which the device is able to estimate with acceptable precisions; the larger the baseline and diameter (d and D) the better the depth map (obtaining better estimations of large distances to the object world). As stated before a tenth of a millimetre can be considered a normal baseline in a plenoptic camera (a typical aperture of the entry pupil of 1 or 2 mm and typical number of 10-20 pixels per microlens). The proposed invention can work in a similar way to a SAII system (or a plenoptic camera) but with just one conventional camera taking sequential views. The proposed invention can use the same algorithms based on the calculation of slopes from the epipolar images as a plenoptic camera (or as a SAII system) to estimate a depth map. However, the invention can work with larger baselines than the baseline of a plenoptic camera (about 0.1 mm), as hand tremors are normally larger than that, therefore, the proposed invention can obtain depth maps of higher quality in terms of accuracy for larger distances. Besides this important advantage, it is even more important to stress that the proposed invention can obtain depth maps with much higher spatial resolution than the ones obtained by a plenoptic camera since the system has the entire resolution of the conventional camera sensor, solving the main drawback of plenoptic cameras (that have the same small spatial resolution as the microlenses, and with about 100 pixels per square microlens their resolution is about 100 times smaller).

In an embodiment, the movement of the mobile device due to hand tremors can be strengthened or substituted by the vibration produced by a small vibration motor included in the mobile device (which can be the vibrations used as substitute or complementary for the call-tones) or by placing the camera on a moving object during the time of exposure (for instance the camera is mounted or placed in an automobile location with ample visibility to areas of concern outside of the automobile).

In another embodiment, the plenoptic and stereo-plenoptic methods described herein to solve the correspondence problem using the accelerometer, the gyroscope, or any other positioning device can be substituted by algorithms that match different images (Stereo-matching or Multiview matching). In yet another embodiment, objects in the foreground can be identified, while in a composed video sequence the background can be moved vs the quiet foreground objects (or foreground objects moving at a slower speed) creating 3D-effects by combining 2D-images at different distances from the camera: when in a video sequence the background image occlusions change with time, when the foreground objects are moving at a slower speed than quicker movements in the background, when the perspective or the size of the foreground objects is slowly changing (for example a shark swimming towards the camera, and increasingly occluding the background in successive frames; or a shark swimming at a constant distance of the camera plane along the FOV, changing the occlusions in successive video frames); or just the contrary, the foreground moving quicker than the background and changing the occlusions. As an example, but not exclusively, in the cases mentioned above, a video sequence combination of several different levels of 2D foreground, middlegrounds and background level images located at several different distances from the camera (levels which can be related to their computed distances because the techniques mentioned in this disclosure allow real-time depth-map calculations of video images), allow a combination of two or more 2D-images to produce a 3D-perception to the viewer.

A light field can be created in many ways, for instance with SAII systems that include an array of cameras or, equivalently, a camera that is moved automatically to take images of the scene from well-defined locations. A light field can also be created using a plenoptic camera. The invention proposed herein is implemented in a mobile device that acquires several images within an interval of time and then rectifies these images using data from the accelerometer, the gyroscope or any other capability of this kind integrated in the device, as described before. This process also composes a light field of the scene. Several embodiments of processing procedures to produce a depth map of a scene from this light field are described below in detail.

A way of obtaining the depth information of a scene from a light field is to analyse the patterns captured by the sensor in the epipolar images. In the proposed invention each of the acquired images (conveniently rectified) is treated as a plenoptic view, and each plenoptic view is used to create the epipolar images. FIGS. 3A-3B-3C show how horizontal 300 and vertical epipolar-images 302 are composed from a light field, and within those images it is possible to identify connected pixels forming lines, the so called epipolar lines. All the illuminated pixels of epipolar lines 62 correspond to the same point in the object world. Additionally, the slopes of these lines are directly related to the size of the pattern illuminated over the microlenses and to the corresponding depth of the point in the object world. Hence, by knowing this pattern it is possible to back-trace the patterns sampled by the pixels through the camera and obtain the exact depth of the point in the object world that produced such pattern. It is well known that in a plenoptic camera the relation between depth and slope depends on the physical dimensions and design of the device used to capture the light field. In this invention, the formation of the patterns in the epipolar images depends on the displacement (baseline) between the different images acquired (different views). This displacement can also be calculated using correspondence algorithms (stereo matching algorithms). These algorithms search for patterns that may appear in two or more images in order to establish a one-to-one relationship between the pixels of said two or more images. These are computing intensive algorithms that we can avoid by using our invention. In our invention, the displacement between images is calculated using the data of the accelerometer, gyroscope or any other capability of this kind integrated in the device. This involves calculations of continuous rotational and translational movements that after "the image rectification process" end up with a one-to-one relationship between the pixels of both images.

Objects at different depths or distances to the camera will produce different illumination patterns onto the sensor of a plenoptic camera as well as on the proposed composition of images taken by a moving camera in a mobile device. As already stated, in the very same way that in a plenoptic camera the so called plenoptic views (that compose a light field) can be represented in epipolar images, in our invention the several "rectified views" that can be sequentially obtained from a single moving camera (that also compose a light field) can also be represented by epipolar images, in both cases epipolar images are composed by taking two dimensional slices of the light field as explained in FIG. 3.

In an embodiment, the plenoptic algorithms used in this invention for depth estimation can apply a linear regression technique to the points that form an epipolar-line to obtain the slope from said epipolar-line. When analysing an epipolar line in a horizontal/vertical epipolar image, all the images (as happens with the plenoptic views) distributed along the vertical/horizontal dimension are considered since the same object point has been captured by several of these views and epipolar lines produced by the same point in the world can appear in several epipolar images. Therefore, this linear regression technique and the use of different epipolar images to calculate distances to the same point in the object world reduce statistical noise by taking advantage of redundant information along one dimension.

In yet another embodiment, all the lines formed in the horizontal and vertical epipolar images are identified and their corresponding slopes are calculated. Then, the corresponding depth of the object is calculated from the slope.

In another embodiment, only one slope (and/or depth) value per epipolar-line is calculated since an epipolar line is formed by the same object point captured from several points of view. Hence, the amount of data is drastically reduced due to two factors: (i) lines are detected only in the epipolar lines corresponding to edges in the object world (as areas of the object world completely uniform, without edges, do not produce any epipolar line) and, (ii) it is possible to compute/store only one slope value per line instead of computing/storing one value per each pixel that forms the epipolar line, as traditionally done in previous art. In at least one embodiment, the output of this calculation process can be just the corresponding depth values of these detected slopes.

In another possible embodiment, the slopes obtained by analysing the horizontal and vertical epipolar-lines are combined into a multi-dimensional matrix to reduce statistical noise. This redundancy improves the output of the invention since the same sensor pixel is considered when analysing both, the vertical and the horizontal epipolar-images and, thus, several slope values are produced by the same point of the object world.

The slopes calculated for the epipolar lines are transformed to the corresponding object depths. In another embodiment, this transformation stage can be performed after combining all the redundant slopes, reducing drastically the number of slope-to-depth transformations.

In another embodiment, the depths/slopes calculated in the horizontal and vertical epipolar-lines are directly combined into a two-dimensional sparse depth/slope map (sparse because it includes depth/slope computations only for the points in the epipolar lines, and not for every point in the image as in previous art), therefore performing a single combination stage, what increases the computational efficiency.

In another embodiment, the sparse depth/slope map can be filled by applying image filling techniques to obtain depth/slope values for every pixel. As a result, the invention provides a dense depth map where each point is associated to the depth estimation of that point in the scene.

In another embodiment, the methods described herein to estimate a depth map can be combined with or replaced by stereo matching algorithms or multiview matching algorithms to improve the final result.

In at least one embodiment, the methods described herein can be implemented in mobile devices equipped with a plenoptic camera.

In an embodiment the epipolar lines may be detected using edge detection algorithms and their slopes may be measured by linear regression techniques (both methodologies, edge detection and linear regression, can be used with subpixel accuracy).

In an embodiment for depth estimation all the calculations can be performed only for those pixels of the sensors where edges of the object world have been detected, avoiding to perform calculations on a very large number of pixels of the sensors.

Power dissipation in mobile terminals (dependent on batteries) is extremely important, that is why computing efficiency in algorithms acquires a paramount importance. It is public knowledge that some 3D phones (using 2 cameras) disable the second camera (and the 3D-function) under low battery conditions. These examples make clear that to obtain depth maps in real-time in mobile devices it is convenient to implement the algorithms in an extremely efficient way. Our invention will enable conventional cameras to provide 3D-images in mobile devices (mobile phones, tablets . . . ) using extremely efficient algorithms to calculate the depth only for the identified edges.

Figure 15B:
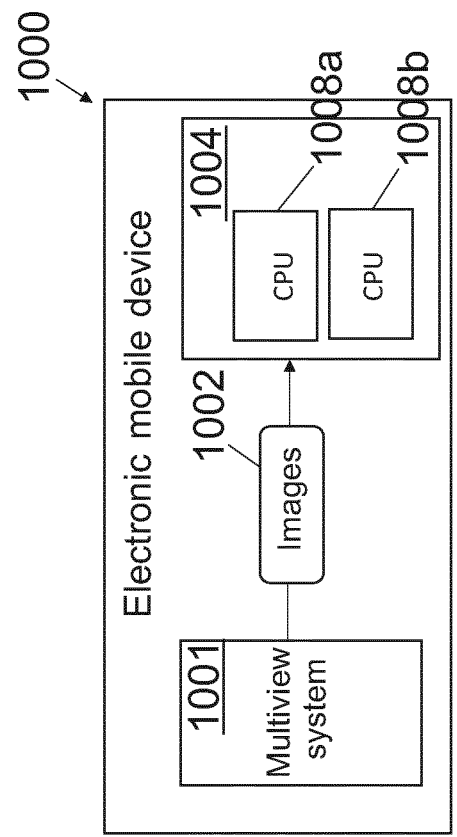
FIG. 15B is as FIG. 15A but with two CPUs (Central Processing Units) instead of a multi-core processor.
Figure 15A:
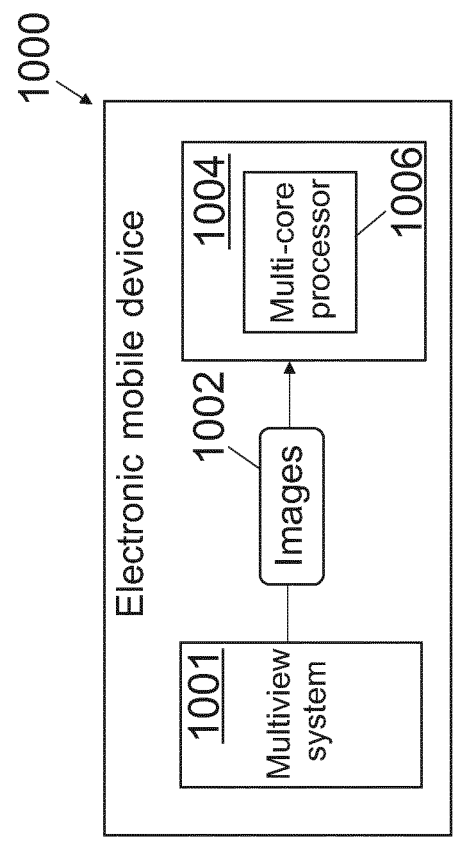
FIG. 15A shows an electronic mobile device that includes a multiview system acquiring images that are treated through a processor that includes a Multi-core processor.
Figure 15C:
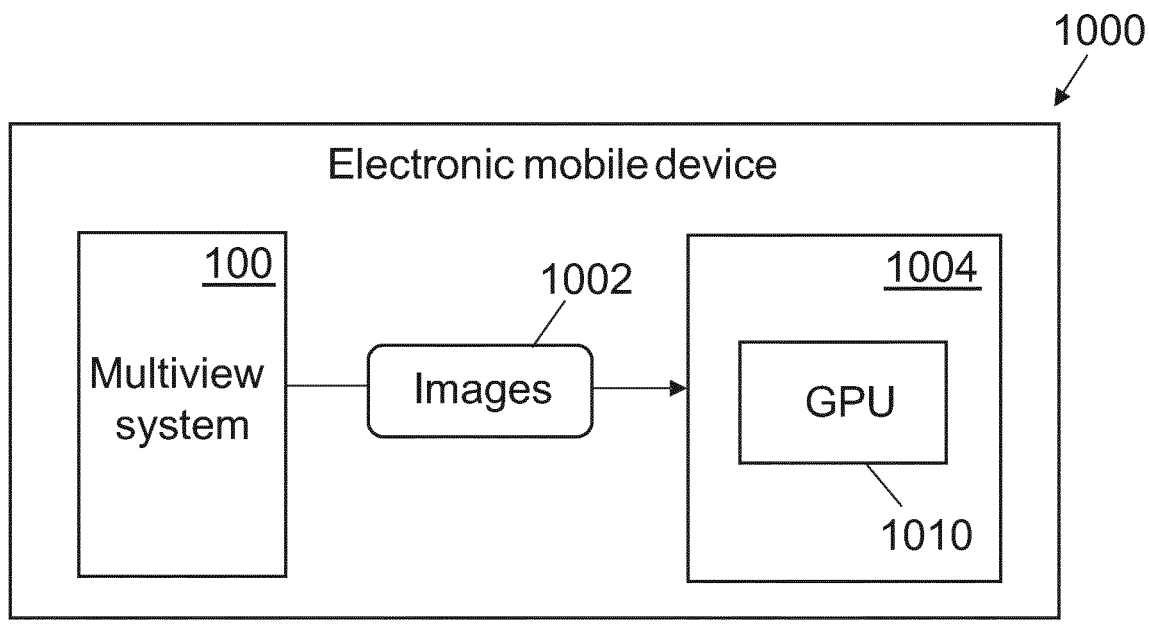
FIG. 15C is as FIG. 15B but the CPUs are replaced by a GPU (Graphics Processing Unit) including a large number of parallel processors.

To do that it is possible to take advantage of the multiple cores included nowadays in processors (even in processors from mobile devices). The essential idea is to create several algorithm execution threads in such a way that each of them is in charge of performing different operations. For example in FIG. 15A we show an electronic mobile device 1000 that includes our Multiview system 1001, capturing images 1002, that are treated through a processor 1004, that can be a multicore processor 1006. The processor 1004 can be composed by two or more CPUs (Central Processing Units) 1008a and 1008b (FIG. 15B).

More advanced computational techniques can be used to increase the computational efficiency. For example, current processors 1004 can include Graphics Processor Units (GPUs) 1010, even those GPUs designed for mobile devices 1010, include several hundreds or thousands of cores capable of executing operations simultaneously.

Accordingly, in at least one embodiment, each epipolar image is processed simultaneously in a different core of a GPU to further accelerate the execution of the algorithm.

The invention claimed is:

1. A method for obtaining depth information from a scene, comprising the steps of:
   a) acquiring, by use of a conventional camera of a mobile device, a plurality of images of a scene during a time of shot of the camera, wherein the camera is moved during the time of shot so that the plurality of images offer at least two different views of the scene;
   b) for each of the acquired plurality of images, simultaneously acquiring a position of the image referred to a six-axis reference system (x, y, z, pitch, roll, yaw), wherein the position of each image acquired during the time of shot is measured from positioning data acquired by at least one positioning device of the mobile device;
   c) rectifying the acquired images so that their positions in the six-axis reference system are coplanar with the same z, pitch, roll and yaw to generate a set of rectified images;
   d) selecting at least two images from the rectified images, wherein the images are selected so that the relative distances (d) in the x and y direction between adjacent images are equal or smaller than on pixel; and
   e) generating a depth map from the selected rectified images.

2. The method according to claim 1, wherein the at least one positioning device selected from the group consisting of: an accelerometer, an IMU, an AHRS, a GPS, a speedometer and a gyroscope.

3. The method according to claim 1, wherein the mobile device is selected from the group consisting of an automobile, a smartphone, a tablet, a laptop and a compact camera.

4. The method according to claim 1, wherein step e) comprises generating a set of epipolar images from the rectified images.

5. The method according to claim 4, wherein step e) further comprises calculating at least one slope of at least one epipolar line obtained from the set of epipolar images.

6. The method according to claim 5, wherein step e) further comprises obtaining a depth map of the scene by converting the slopes of the epipolar lines to depths.

7. The method according to claim 1, wherein the movements of the camera are uncertain random movements produced by human hand tremors during the time of shot.

8. The method according to claim 1, wherein the camera is attached to a structure moving relative to the scene.

9. A mobile device for obtaining depth information from a scene comprising a conventional camera, at least one positioning device and a processor configured to:
   a) acquire, using the conventional camera, a plurality of images of a scene during a time of shot of the camera, wherein the camera is moved during the time of shot so that the plurality of images offer at least two different views of the scene;
b) for each of the acquired images, simultaneously acquire a position of the image referred to a six-axis reference system (x, y, z, pitch, roll, yaw), wherein the position of each image acquired during the time of shot is measured from positioning data acquired by the at least one positioning device;
c) rectify the acquired images so that their positions in the six-axis reference system are coplanar with the same z, pitch, roll and yaw to generate a set of rectified images;
d) select at least two images from the rectified images, wherein the images are selected so that the relative distances (d) in the x and y direction between adjacent images are equal or smaller than one pixel; and
e) generate a depth map from the selected rectified images.

10. The method according to claim 1, further comprising selecting at least one additional image from the rectified images, wherein the at least one additional image is selected so that the relative distance (d) in the x and y direction with the previously selected images is larger than one pixel, and wherein step e) comprising generating a depth map from the selected rectified images and the at least one selected additional image.

* * * * *